(12) United States Patent
Kim et al.

(10) Patent No.: US 10,796,363 B1
(45) Date of Patent: Oct. 6, 2020

(54) CUSTOMIZED FINANCING BASED ON TRANSACTION INFORMATION

(71) Applicant: Square, Inc., San Francisco, CA (US)

(72) Inventors: Audrey Kim, San Francisco, CA (US); Theodore Mao, Mill Valley, CA (US)

(73) Assignee: SQUARE, INC., San Francisco, CA (US)

( * ) Notice: Subject to any disclaimer, the term of this patent is extended or adjusted under 35 U.S.C. 154(b) by 271 days.

(21) Appl. No.: 15/814,378

(22) Filed: Nov. 15, 2017

(51) Int. Cl.
  G06Q 40/02 (2012.01)
  G06Q 20/40 (2012.01)
  G06Q 20/20 (2012.01)
  G06N 20/00 (2019.01)

(52) U.S. Cl.
  CPC .......... G06Q 40/025 (2013.01); G06N 20/00 (2019.01); G06Q 20/202 (2013.01); G06Q 20/40 (2013.01)

(58) Field of Classification Search
  CPC .................... G06Q 40/025; G06Q 20/202
  See application file for complete search history.

(56) References Cited

U.S. PATENT DOCUMENTS

| | | |
|---|---|---|
| 6,167,385 A | 12/2000 | Hartley-Urquhart |
| 6,941,281 B1 | 9/2005 | Johnson |
| 6,985,886 B1 | 1/2006 | Broadbent et al. |
| 7,103,570 B1 | 9/2006 | Morea et al. |
| 7,181,427 B1 | 2/2007 | DeFrancesco et al. |
| 7,302,696 B1 | 11/2007 | Yamamoto |
| 7,353,203 B1 | 4/2008 | Kriplani et al. |
| 7,953,653 B2 | 5/2011 | Siggers et al. |
| 8,239,227 B2 | 8/2012 | Megiddo et al. |
| 8,666,847 B1 | 3/2014 | Blank et al. |
| 8,732,040 B1 | 5/2014 | Prabhune et al. |
| 8,799,133 B2 | 8/2014 | Gula, IV |
| 9,672,512 B1 | 6/2017 | Gailloux et al. |

(Continued)

FOREIGN PATENT DOCUMENTS

| | | |
|---|---|---|
| CA | 2 838 406 A1 | 4/2015 |
| WO | 99/03076 A1 | 1/1999 |
| WO | 2012/150985 A1 | 11/2012 |

OTHER PUBLICATIONS

Non-Final Office Action dated Apr. 23, 2019, for U.S. Appl. No. 15/814,366, of Kim, A., et al., filed Nov. 15, 2017.

(Continued)

*Primary Examiner* — A. Hunter Wilder
(74) *Attorney, Agent, or Firm* — Mattingly & Malur, PC

(57) ABSTRACT

In some examples, a payment processing system may receive identity information identifying a buyer and an indication of a buyer interest in purchasing an item from a first merchant. The system may determine, based on the identity information and item information, that the buyer is eligible for financing the purchase of the item. The system may generate a customized financing offer for the buyer to finance the purchase price of the item. For example, the customized financing offer may include financing terms and may be based on previous financing activity of the buyer with one or more merchants associated with the payment processing system, and/or previous financing activity associated with one or more buyers that have financed the item from the first merchant. The payment processing system may transmit the customized financing offer to cause a user interface to present the customized financing offer to the buyer.

22 Claims, 21 Drawing Sheets

(56) References Cited

U.S. PATENT DOCUMENTS

| | | | |
|---|---|---|---|
| 9,727,912 B1 * | 8/2017 | Poursartip | G06Q 40/025 |
| 9,773,242 B1 | 9/2017 | Boates et al. | |
| 9,779,432 B1 | 10/2017 | Shearer et al. | |
| 9,786,005 B1 | 10/2017 | Poursartip et al. | |
| 9,824,394 B1 | 11/2017 | Boates et al. | |
| 9,830,651 B1 | 11/2017 | Brock | |
| 9,836,786 B1 | 12/2017 | Baker | |
| 9,875,469 B1 | 1/2018 | Chin et al. | |
| 9,892,458 B1 | 2/2018 | Shearer et al. | |
| 9,934,530 B1 | 4/2018 | Iacono et al. | |
| 9,978,099 B2 | 5/2018 | Rephlo et al. | |
| 10,445,826 B1 | 10/2019 | Poursartip et al. | |
| 10,453,086 B1 | 10/2019 | Scott et al. | |
| 10,535,054 B1 | 1/2020 | Sptizer et al. | |
| 10,692,140 B1 | 6/2020 | Kim et al. | |
| 2002/0038277 A1 | 3/2002 | Yuan | |
| 2002/0174061 A1 | 11/2002 | Srinivasan et al. | |
| 2003/0101107 A1 | 5/2003 | Agarwal et al. | |
| 2003/0191709 A1 | 10/2003 | Elston et al. | |
| 2004/0054625 A1 | 3/2004 | Kellogg et al. | |
| 2004/0064398 A1 | 4/2004 | Browne et al. | |
| 2004/0193540 A1 | 9/2004 | Brown et al. | |
| 2005/0149408 A1 | 7/2005 | Kenny et al. | |
| 2006/0095350 A1 | 5/2006 | Hall et al. | |
| 2007/0117601 A1 | 5/2007 | Van Luchene | |
| 2007/0156579 A1 | 7/2007 | Manesh | |
| 2007/0156584 A1 | 7/2007 | Barnes et al. | |
| 2007/0174191 A1 | 7/2007 | Keaton et al. | |
| 2007/0192235 A1 | 8/2007 | Menichilli et al. | |
| 2007/0255635 A1 | 11/2007 | Multer et al. | |
| 2007/0255653 A1 | 11/2007 | Tumminaro et al. | |
| 2008/0033825 A1 | 2/2008 | Goldin | |
| 2008/0052229 A1 | 2/2008 | Sheinker et al. | |
| 2008/0109348 A1 | 5/2008 | Saxena et al. | |
| 2008/0154769 A1 | 6/2008 | Anderson et al. | |
| 2009/0043697 A1 | 2/2009 | Jacobs et al. | |
| 2009/0171843 A1 | 7/2009 | Lee et al. | |
| 2010/0032308 A1 | 2/2010 | Qi et al. | |
| 2010/0223154 A1 | 9/2010 | Frohwein et al. | |
| 2010/0228651 A1 | 9/2010 | Becerra et al. | |
| 2010/0268667 A1 | 10/2010 | King et al. | |
| 2010/0299251 A1 | 11/2010 | Thomas | |
| 2010/0306071 A1 | 12/2010 | Kay | |
| 2010/0332265 A1 | 12/2010 | Smith | |
| 2011/0055056 A1 | 3/2011 | Kwatinetz | |
| 2011/0202445 A1 | 8/2011 | Torres | |
| 2011/0251870 A1 | 10/2011 | Tavares et al. | |
| 2011/0251892 A1 | 10/2011 | Laracey | |
| 2012/0011071 A1 | 1/2012 | Pennock et al. | |
| 2012/0022945 A1 | 1/2012 | Falkenborg et al. | |
| 2012/0054097 A1 | 3/2012 | Frohwein et al. | |
| 2012/0066033 A1 | 3/2012 | Frohwein et al. | |
| 2012/0089436 A1 | 4/2012 | Tavares et al. | |
| 2012/0143649 A1 | 6/2012 | Aubertin | |
| 2012/0191525 A1 | 7/2012 | Singh et al. | |
| 2012/0209734 A1 | 8/2012 | Brooks et al. | |
| 2012/0221446 A1 | 8/2012 | Grigg et al. | |
| 2012/0226595 A1 | 9/2012 | Torres | |
| 2012/0233010 A1 | 9/2012 | Frohwein et al. | |
| 2012/0233090 A1 | 9/2012 | Tavares et al. | |
| 2012/0239552 A1 | 9/2012 | Harycki | |
| 2012/0271765 A1 | 10/2012 | Cervenka et al. | |
| 2012/0290474 A1 | 11/2012 | Hoke | |
| 2013/0046643 A1 | 2/2013 | Wall et al. | |
| 2013/0054484 A1 | 2/2013 | Hoeflinger et al. | |
| 2013/0085804 A1 | 4/2013 | Leff et al. | |
| 2013/0124432 A1 | 5/2013 | Thibodeau | |
| 2013/0132274 A1 | 5/2013 | Henderson et al. | |
| 2013/0138544 A1 | 5/2013 | Chapman | |
| 2013/0185228 A1 | 7/2013 | Dresner | |
| 2013/0204664 A1 | 8/2013 | Romagnolo et al. | |
| 2013/0211892 A1 | 8/2013 | Frohwein et al. | |
| 2013/0226688 A1 | 8/2013 | Harvilicz et al. | |
| 2013/0264385 A1 * | 10/2013 | Stoudt | G06Q 20/34 235/380 |
| 2013/0268417 A1 | 10/2013 | Sgueglia | |
| 2013/0332265 A1 | 12/2013 | Sossaman, II et al. | |
| 2013/0346302 A1 | 12/2013 | Purves et al. | |
| 2014/0006202 A1 | 1/2014 | Frohwein et al. | |
| 2014/0025473 A1 | 1/2014 | Cohen | |
| 2014/0025525 A1 | 1/2014 | Frohwein et al. | |
| 2014/0032298 A1 | 1/2014 | Corrie et al. | |
| 2014/0032307 A1 | 1/2014 | Corrie et al. | |
| 2014/0032308 A1 | 1/2014 | Corrie et al. | |
| 2014/0032309 A1 | 1/2014 | Corrie et al. | |
| 2014/0032310 A1 | 1/2014 | Corrie et al. | |
| 2014/0040157 A1 | 2/2014 | Cohen et al. | |
| 2014/0052668 A1 | 2/2014 | Cameron et al. | |
| 2014/0058804 A1 | 2/2014 | Zhou et al. | |
| 2014/0074631 A1 | 3/2014 | Grossman et al. | |
| 2014/0129357 A1 | 5/2014 | Goodwin et al. | |
| 2014/0143120 A1 | 5/2014 | Clarke et al. | |
| 2014/0143124 A1 | 5/2014 | Sanders | |
| 2014/0143405 A1 | 5/2014 | Pavlidis et al. | |
| 2014/0164049 A1 | 6/2014 | Yakos et al. | |
| 2014/0171039 A1 | 6/2014 | Bjontegard | |
| 2014/0207550 A1 | 7/2014 | Eden et al. | |
| 2014/0229397 A1 | 8/2014 | Fink | |
| 2014/0244361 A1 | 8/2014 | Zhang et al. | |
| 2014/0244486 A1 | 8/2014 | Abril | |
| 2014/0258094 A1 | 9/2014 | Jouhikainen et al. | |
| 2014/0279682 A1 | 9/2014 | Feldman | |
| 2014/0304137 A1 | 10/2014 | Olson et al. | |
| 2014/0316823 A1 | 10/2014 | Cooper | |
| 2014/0344037 A1 | 11/2014 | Dunbar et al. | |
| 2014/0351116 A1 | 11/2014 | Hoff | |
| 2014/0358766 A1 | 12/2014 | Nayyar et al. | |
| 2015/0026035 A1 | 1/2015 | Showalter | |
| 2015/0039490 A1 | 2/2015 | Forrester et al. | |
| 2015/0088727 A1 | 3/2015 | Goldblatt | |
| 2015/0095210 A1 | 4/2015 | Grech et al. | |
| 2015/0100475 A1 | 4/2015 | Cummings et al. | |
| 2015/0134439 A1 | 5/2015 | Maxwell et al. | |
| 2015/0149333 A1 | 5/2015 | Yaplee et al. | |
| 2015/0161606 A1 | 6/2015 | Lee | |
| 2015/0168478 A1 | 6/2015 | Öhlen et al. | |
| 2015/0170286 A1 | 6/2015 | Gingell et al. | |
| 2015/0186885 A1 | 7/2015 | Agrawal et al. | |
| 2015/0206164 A1 | 7/2015 | Espana et al. | |
| 2015/0332414 A1 | 11/2015 | Unser et al. | |
| 2016/0019614 A1 | 1/2016 | Dziuk | |
| 2016/0092874 A1 | 3/2016 | O'regan et al. | |
| 2016/0110671 A1 | 4/2016 | Ghosh et al. | |
| 2016/0180328 A1 | 6/2016 | Loomis | |
| 2016/0203506 A1 | 7/2016 | Butler et al. | |
| 2016/0203551 A1 | 7/2016 | Tutte et al. | |
| 2016/0210634 A1 | 7/2016 | Trujillo | |
| 2017/0004495 A1 | 1/2017 | Snyder et al. | |
| 2018/0096335 A1 | 4/2018 | Moghaizel et al. | |
| 2018/0150910 A1 | 5/2018 | Grech et al. | |
| 2018/0181941 A1 | 6/2018 | Maxwell et al. | |
| 2018/0300741 A1 | 10/2018 | Leonard et al. | |

OTHER PUBLICATIONS

Non-Final Office Action dated Jul. 16, 2019, for U.S. Appl. No. 15/722,003, of Shearer, D.J., et al., filed Oct. 2, 2017.

Final Office Action dated Sep. 13, 2017, for U.S. Appl. No. 14/616,520, of Boates, B., et al., filed Feb. 6, 2015.

Notice of Allowance dated Sep. 20, 2017, for U.S. Appl. No. 14/675,127, of Shearer, D.J., et al., filed Mar. 31, 2015.

Notice of Allowance dated Sep. 22, 2017, for U.S. Appl. No. 14/622,605, of Scott, J.B., et al., filed Feb. 13, 2015.

Non-Final Office Action dated Nov. 8, 2017, for U.S. Appl. No. 15/725,591, of Poursartip, A., et al., filed Oct. 5, 2017.

Final Office Action dated Dec. 29, 2017, for U.S. Appl. No. 14/676,678, of Scott, J.B., et al., filed Apr. 1, 2015.

Final Office Action dated Jan. 9, 2018, for U.S. Appl. No. 14/602,486, of Fern, A.J., et al., filed Jan. 22, 2015.

Notice of Allowance dated Jan. 19, 2018, for U.S. Appl. No. 14/491,965, of Poursartip, A., et al., filed Sep. 19, 2014.

Notice of Allowance dated Dec. 13, 2019, for U.S. Appl. No. 14/993,804, of Spitzer, G., et al., filed Jan. 12, 2016.

(56) References Cited

OTHER PUBLICATIONS

Non-Final Office Action dated Dec. 26, 2019, for U.S Appl. No. 16/207,688, of Chinot, N. et al. filed Dec. 3, 2018.
Final Office Action dated Jan. 10, 2019, for U.S. Appl. No. 14/993,804, of Spizer, G., filed Jan. 12, 2016.
"Oracle Retail Advanced Inventory Planning," www.oracle.com, pp. 1-2 (2013).
Agrawal, A., et al., "Some Simple Economics of Crowdfunding," University of Toronto, dated Jun. 1, 2013, pp. 1-46.
Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.
Giusti, A.C., "Want More Revenue? Enhance The Offers: Carefully matching merchants with the right products and ensuring agents know them well can dictate how much an ISO may earn from value-added services," ISO & Agent 7.4, dated May 1, 2011, pp. 1-2.
Leung, L., "PayPal ramps up small-business loans," The Orange County register, Journal—Gazette [Ft. Wayne, Ind], dated Feb. 10, 2014, pp. 1-2.
Steinberg, S., and Demaria, R., "The Crowdfunding Bible: Flow to raise money for any startup, video game or project," READ.ME, dated 2012, pp. 1-47.
Non-Final Office Action dated Jan. 8, 2015, for U.S. Appl. No. 14/491,958, of Poursartip, A., et al., filed Sep. 19, 2014.
Non-Final Office Action dated Mar. 27, 2015, for U.S. Appl. No. 14/491,965, of Poursartip, A., et al., filed Sep. 19, 2014.
Non-Final Office Action dated Mar. 27, 2015, for U.S. Appl. No. 14/491,967, of Poursartip, A., et al., filed Sep. 19, 2014.
Final Office Action dated May 20, 2015, for U.S. Appl. No. 14/491,958, of Poursartip, A., et al., filed Sep. 19, 2014.
Advisory Action dated Jul. 27, 2015, for U.S. Appl. No. 14/491,958, of Poursartip, A., et al., filed Sep. 19, 2014.
Non-Final Office Action dated Aug. 27, 2015, for U.S. Appl. No. 14/675,127, of Shearer, D.J., et al., filed Mar. 31, 2015.
Non-Final Office Action dated Aug. 27, 2015, for U.S. Appl. No. 14/540,947, of Baker, G. K., et al., filed Nov. 13, 2014.
Non-Final Office Action dated Oct. 8, 2015, for U.S. Appl. No. 14/167,931, of Brock, Z., et al., filed Jan. 29, 2014.
=Final Office Action dated Oct. 8, 2015, for U.S. Appl. No. 14/491,967, of Poursartip, A., et al., filed Sep. 19, 2014.
=Final Office Action dated Nov. 6, 2015, for U.S. Appl. No. 14/491,965, of Poursartip, A., et al., filed Sep. 19, 2014.
Non-Final Office Action dated Jan. 5, 2016, for U.S. Appl. No. 14/491,958, of Poursartip, A., et al., filed Sep. 19, 2014.
Non-Final Office Action dated Jan. 13, 2016, for U.S. Appl. No. 14/663,209, of Boates, B., et al., filed Mar. 19, 2015.
Non-Final Office Action dated Jan. 21, 2016, for U.S. Appl. No. 14/675,257, of Shearer, D. J., et al., filed Mar. 31, 2015.
Non-Final Office Action dated Feb. 12, 2016, for U.S. Appl. No. 14/540,947, of Baker, G. K., et al., filed Nov. 13, 2014.
Final Office Action dated Mar. 31, 2016, for U.S. Appl. No. 14/675,127, of Shearer, D. J., et al., filed Mar. 31, 2015.
Non-Final Office Action dated Apr. 27, 2016, for U.S. Appl. No. 14/616,515, of Boates, B., et al., filed Feb. 6, 2015.
Non-Final Office Action dated May 5, 2016, for U.S. Appl. No. 14/491,967, of Poursartip, A., et al., filed Sep. 19, 2014.
Final Office Action dated May 12, 2016, for U.S. Appl. No. 14/167,931, of Brock, Z., et al., filed Jan. 29, 2014.
Non-Final Office Action dated Jun. 17, 2016, for U.S. Appl. No. 14/491,965, of Poursartip, A., et al., filed Sep. 19, 2014.
Non-Final Office Action dated Jun. 17, 2016, for U.S. Appl. No. 14/622,605, of Scott, J.B., et al., filed Feb. 13, 2015.
Final Office Action dated Aug. 3, 2016, for U.S. Appl. No. 14/663,209, of Boates, B., et al., filed Mar. 19, 2015.
Non-Final Office Action dated Sep. 9, 2016, for U.S. Appl. No. 14/540,947, of Baker, G. K., filed Nov. 13, 2014.
Final Office Action dated Oct. 7, 2016, for U.S. Appl. No. 14/675,257, of Shearer, D. J., et al., filed Mar. 31, 2015.
Final Office Action dated Oct. 21, 2016, for U.S. Appl. No. 14/491,967, of Poursartip, A., et al., filed Sep. 19, 2014.
Non-Final Office Action dated Nov. 3, 2016, for U.S. Appl. No. 14/675,127, of Shearer, D.J., et al., filed Mar. 31, 2015.
Non-Final Office dated Nov. 28, 2016, for U.S. Appl. No. 14/491,963, of Poursartip, A., et al., filed Sep. 19, 2014.
Non-Final Office Action dated Dec. 19, 2016, for U.S. Appl. No. 14/491,965, of Poursartip, A., et al., filed Sep. 19, 2014.
Non-Final Office Action dated Jan. 11, 2017, for U.S. Appl. No. 14/167,931, of Brock, Z., filed Jan. 29, 2014.
Examiner's Answer to Appeal Brief mailed Jan. 27, 2017, for U.S. Appl. No. 14/491,958, of Poursartip, A., et al., filed Sep. 19, 2014.
Non-Final Office Action dated Feb. 10, 2017, for U.S. Appl. No. 14/622,605, of Scott, J.B., et al., filed Feb. 13, 2015.
Final Rejection dated Feb. 17, 2017, for U.S. Appl. No. 14/616,515, of Boates, B., et al., filed Feb. 6, 2015.
Non-Final Office Action dated Mar. 1, 2017, for U.S. Appl. No. 14/616,520, of Boates, B., et al., filed Feb. 6, 2015.
Notice of Allowance dated Mar. 30, 2017, for U.S. Appl. No. 14/491,967, of Poursartip, A., et al., filed Sep. 19, 2014.
Final Office Action dated Apr. 6, 2017, for U.S. Appl. No. 14/540,947, of Baker, G.K., filed Nov. 13, 2014.
Final Office Action dated Apr. 10, 2017, for U.S. Appl. No. 14/675,127, of Shearer, D.J., et al., filed Mar. 31, 2015.
Non-Final Office Action dated May 10, 2017, for U.S. Appl. No. 14/602,486, of Fern, A.J., et al., filed Jan. 22, 2015.
Non-Final Office Action dated May 16, 2017, for U.S. Appl. No. 14/676,678, of Scott, J.B., et al., filed Apr. 1, 2015.
Notice of Allowance dated May 25, 2017, for U.S. Appl. No. 14/663,209, of Boates, B., et al., filed Mar. 19, 2015.
Notice of Allowance dated May 31, 2017, for U.S. Appl. No. 14/675,257, of Shearer, D.J., et al., filed Mar. 31, 2015.
Notice of Allowance dated Jun. 7, 2017, for U.S. Appl. No. 14/491,963, of Poursartip, A., et al., filed Sep. 19, 2014.
Notice of Allowance dated Jun. 22, 2017, for U.S. Appl. No. 14/540,947, of Baker, G.K., filed Nov. 13, 2014.
Notice of Allowance dated Jul. 24, 2017, for U.S. Appl. No. 14/616,515, of Boates, B., et al., filed Feb. 6, 2015.
Notice of Allowance dated Jul. 25, 2017, for U.S. Appl. No. 14/167,931, of Brock, Z., filed Jan. 29, 2014.
Final Office Action dated Jul. 27, 2017, for U.S. Appl. No. 14/491,965, of Poursartip, A., et al., filed Sep. 19, 2014.
"PayPal Here: Credit Card Reader | Point of Sale and Mobile Credit Card Processing," PayPal.com, accessed at https://web.archive.org/web/20141202030140/https://www.paypal.com/us/webapps/mpp/credit-card-reader, Accessed on Dec. 2, 2012, pp. 6.
Non-Final Office Action dated Jul. 10, 2018, for U.S. Appl. No. 14/993,804, of Spizer, G., filed Jan. 12, 2016.
Final Office Action dated Sep. 6, 2018, for U.S. Appl. No. 15/814,366, of Kim, A., et al., filed Nov. 15, 2017.
Non-Final Office Action dated Feb. 26, 2019, for U.S. Appl. No. 16/207,688, of Chinot, N. et al. filed Dec. 3, 2018.
Non-Final Office Action dated Mar. 8, 2018, for U.S. Appl. No. 15/814,366, of Kim, A., et al., filed Nov. 15, 2017.
Mallat., et al., "Mobile banking services," Communications of the ACM 47.5, (2004), pp. 42-46.
Pousttchi, K., and Yvonne, H., "Mobile payment in the smartphone age: extending the mobile payment reference model with non-traditional revenue streams," Proceedings of the 10th International Conference on Advances in Mobile Computing & Multimedia. ACM, 2012.
Pousttchi, K., et al., "Proposing a comprehensive framework for analysis and engineering of mobile payment business models," Information Systems and E-Business Management 7.3, (2009), pp. 363-393.
Final Office Action dated Sep. 6, 2019, for U.S. Appl. No. 16/207,688, of Chinot, N. et al. filed Dec. 3, 2018.
Notice of Allowance dated Sep. 10, 2019, for U.S. Appl. No. 14/993,804, of Spitzer, G., et al., filed Jan. 12, 2016.
Non-Final Office Action dated Oct. 4, 2019, for U.S. Appl. No. 15/798,868, of Boates, B., et al., filed Oct. 31, 2017.

(56) References Cited

OTHER PUBLICATIONS

Notice of Allowance dated Oct. 23, 2019, for U.S. Appl. No. 15/814,366, of Kim, A., et al., filed Nov. 15, 2017.
Final Office Action dated Feb. 6, 2020, for U.S. Appl. No. 15/722,003, of Shearer, D.J., et al., filed Oct. 2, 2017.
Notice of Allowance dated Mar. 10, 2020, for U.S. Appl. No. 15/814,366, of Kim, A., et al., filed Nov. 15, 2017.
Corrected Notice of Allowability dated Apr. 8, 2020, for U.S. Appl. No. 15/814,366, of Kim, A., et al., filed Nov. 15, 2017.
Notice of Allowance dated Apr. 22, 2020, for U.S. Appl. No. 15/798,868, of Boates, B., et al., filed Oct. 31, 2017.
Notice of Allowance dated May 20, 2020, for U.S. Appl. No. 15/722,003, of Shearer, D.J., et al., filed Oct. 2, 2017.
Final Office Action dated Jun. 25, 2020, for U.S Appl. No. 16/207,688, of Chinot, N. et al. filed Dec. 3, 2018.
Non-Final Office Action dated Jun. 30, 2020, for U.S. Appl. No. 15/868,315, of Wolter, J., et al., filed Jan. 11, 2018.

* cited by examiner

US 10,796,363 B1

CUSTOMIZED FINANCING BASED ON TRANSACTION INFORMATION

BACKGROUND

Buyers typically conduct transactions with many different merchants for acquiring many different types of goods and services (hereinafter "items"). Merchants, who are purveyors of these items, often perform transactions with buyers in person at the merchant's place of business or other point-of-sale (POS) location. Sometimes a buyer may not have sufficient funds to buy a desired item at a particular time. This may cause the merchant to lose a potential sale and may cause the buyer to have to return to the merchant's POS location later to perform a transaction for purchasing the item.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
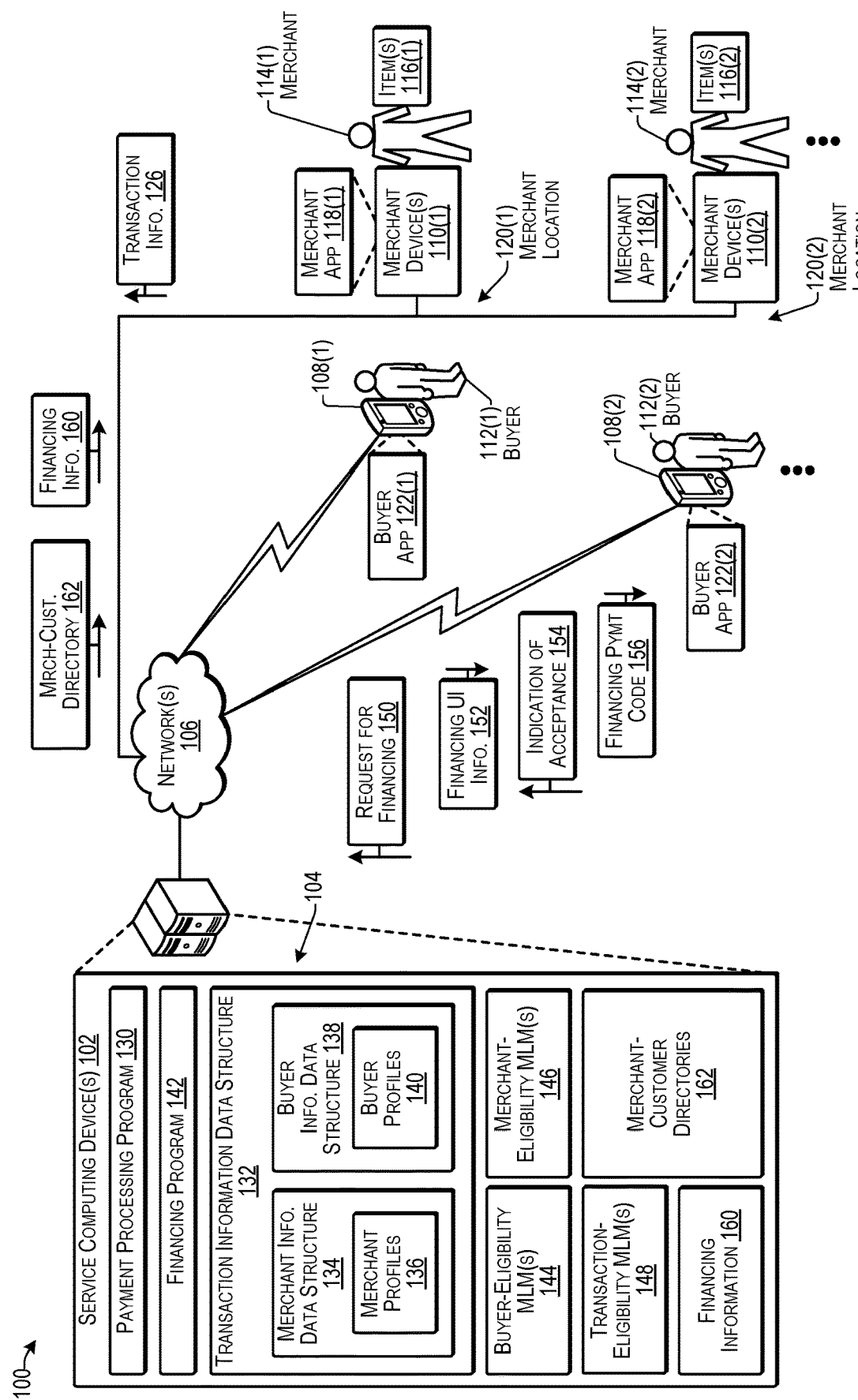
FIG. 1 illustrates an example distributed system according to some implementations.

The technology herein includes a distributed system of merchant devices and buyer devices in communication with one or more service computing devices of a payment processing service. The distributed system herein includes improved functionality that enables the service computing device to determine financing for eligible buyers for making purchases from certain select merchants based at least partially on information related to past transactions conducted by a plurality of merchants that use the payment processing system. The financing herein may encompass various financing methods, such as cash advances, loans, and so forth, and may include proximate intelligent early underwriting of consumer financing based on machine learning related to buyer purchase behavior and merchant point-of-sale (POS) information. For example, the payment processing service may employ a buyer-facing user interface (UI) to obtain information from a buyer, such as buyer shopping location, items for which financing is desired, merchants from whom buyers desire to purchase items using financing, and the like. As one example, the payment processing service may identify a buyer at a place of business or other POS location of a particular merchant, and may immediately pre-underwrite the buyer for common and/or selected purchases at that merchant.

In some implementations, the distributed system herein enables buyers to easily obtain financing in a real-time manner for an item to be purchased in-store while the buyer is at the POS location. Alternatively, the buyer may obtain financing approval prior to going to the store. In either case, a financing user interface (UI) may be presented on a buyer device or on a buyer-facing display associated with the merchant's point-of-sale (POS) terminal. As an example, the buyer may access the financing UI through a buyer application, such as a browser, a dedicated purchasing application, a wallet application, or the like. As another example, the buyer may access the financing UI by scanning a machine-readable indicia, such as a two-dimensional (2-D) barcode, associated with a desired item, and which may cause the financing UI to be presented on the buyer device. The financing UI may present an offer for financing to the buyer. The buyer may enter buyer information into the financing UI (e.g., through a touch screen interface) and submit a request for financing to the service computing device, which may determine buyer eligibility for the financing offer.

In some examples, the buyer may request financing for making a purchase from a specified merchant (e.g., while in the merchant's store or prior to visiting the merchant's store). The service computing device may determine the buyer's eligibility for financing and may determine custom financing terms for the buyer. For instance, the eligibility and/or financing terms may be determined based on the past purchase activity of the buyer at the specified merchant and/or similar merchants, and/or based on the past purchase activity of other buyers at the specified merchant and/or similar merchants, and/or based on past financing activity of the buyer at the specified merchant and/or similar merchants. Based on analysis of this information, and in some cases, following a check of the buyer's credit worthiness, the service computing device may generate a custom financing offer for the requesting buyer.

As one example, suppose that the buyer would like to purchase a mattress at a specified furniture store. The buyer may access the financing UI and may enter the pricing for the selected mattress in the financing UI. Alternatively, the buyer may scan a barcode or take a photo of a label associated with the mattress, or may manually enter a UPC (Universal Product Code) number, and the service computing device may determine the price and tax as the total purchase price for the mattress. For example, the service computing device may access a merchant data structure that maintains the prices of items offered by the merchant and the sales tax at the merchant's location. The service computing device may use the item price plus tax as the purchase price to be financed. As still another alternative, the merchant may send an electronic communication to the buyer device, such as by email, SMS messaging, or the like, and the electronic communication may include the purchase price and a link, such as a URL (uniform resource locator), or other interactive feature that the buyer may select to access the financing UI.

Based on receiving the request for financing of the mattress purchase from the buyer device, the service computing device may access a transaction information data structure that includes transaction information from a large number of transactions conducted by the buyer and/or other buyers with a large number of merchants. For example, the service computing device may determine the buyer's past purchase activity at the current furniture store and/or at other furniture stores. In addition, the service computing device may determine the representative purchase activity of other buyers at the specified furniture store (e.g., customers may typically purchase high-end mattresses, such as with a pricing similar to that of the item specified by the buyer, rather than lower-priced options). Based on the buyer's transaction history and/or the transaction history of the specified merchant and/or similar merchants, the service computing device may determine that the buyer is eligible and may further determine the financing terms based at least in part on this information. For example, a transaction profile determined for a particular merchant from the transaction information may be used to determine the financing terms to offer to a buyer seeking to purchase an item from the particular merchant.

Communication of the financing approval information to the buyer can be via the buyer application (e.g., via an installed purchasing application, a browser-based web interface, etc.), or by other electronic communication types, such as email or text. Alternatively, in the case that the buyer is using the merchant's POS terminal to request the financing, the communication of the financing approval to the buyer may be via the display associated with the POS terminal.

Further, the buyer may receive a virtual payment card or other financing authorization information referred to herein as a financing payment code. For example, the financing payment code may be a multiple-character string, similar to a credit card number or other payment card number, which does not run on payment rails, but when provided at a POS terminal of a merchant that uses the payment service, can be recognized by the merchant application executing on the POS terminal and may be processed by the POS terminal as a financed purchase that is financed by the payment service. The financing payment code may also be entered in another application on the buyer's device, such as an electronic wallet or other payment application, and may be added to a merchant-customer directory provided to the merchant by the service computing device.

Some examples herein provide a closed-loop transaction in which the payment service provides the financing along with processing of the transaction at the point of sale. Thus, the financing may be part of the settlement between the buyer, the merchant, and the service provider. Further, through the use of a buyer facing UI and machine learning models for determining buyer eligibility and financing terms, the techniques herein enable a faster authorization process at buyer device or the POS terminal when compared with conventional financing techniques because the financing is provided directly by the payment service provider (e.g., no payment rails, no authorization to third-party banks, etc.). Implementations herein may also be used to finance online purchases, which is different from other online financing options because the service computing device determines the financing amount and terms to provide based on the purchase price of a particular item from a particular merchant, rather than just opening a revolving line of credit for a buyer, and/or for the buyer at a particular merchant.

Additionally, in some cases, the offered financing may include an offer for an additional financed amount when the service computing device determines that the buyer may desire or need to purchase other items in addition to the specified item. For example, the service computing device may determine the actual amount the buyer might desire to finance for a purchase, including the sales tax, and may also determine whether there are any complimentary or accessory items that might be purchased with the specified item, and may determine whether financing should be offered for those items as well. For example, based on past sales information associated with the specified item (or category of items) determined e.g., from the transaction information data structure, the service computing device may determine other items typically purchased with the item specified by the buyer. For instance, in the case of a mattress, the service computing device may determine that customers usually purchase a bed frame with the purchase a mattress from the merchant specified by the buyer. In the case of a television, the service computing device may determine that buyers typically purchase an HDMI cable and a surge protector. Thus, the offer for the financing may exceed the amount requested by the buyer, and may include an offer for additional financing for one or more accessory items. The offer for financing may further include a recommendation that the buyer consider purchasing the one or more accessory items. Thus, service provider may provide an add-on sale recommendation to the buyer on behalf of the merchant as an added benefit to the merchant. Additionally, in some cases, the service computing device may offer only partial financing, with the buyer having to pay for a remaining portion of the purchase price with a different payment instrument, such as cash, check, credit card, or the like.

After the offer for financing is accepted by the buyer, the merchant can be paid in full for the purchase through an electronic deposit transferred by the payment processing system to a financial account of the merchant. Thus, in the example above, the merchant selling the mattress to the buyer may be paid in full at the time of purchase and the buyer may make payments to the payment processing system for a total amount of purchase price, plus agreed-to interest or a financing fee. In one example, the total amount can be collected automatically by the payment processing system as a plurality of payments charged to a debit card of the buyer. For example, the buyer may be required to provide debit card information as part of the financing request. Alternatively, the buyer may make manual payments via debit card, check, money order, or the like. In another example, the buyer may opt to make a payment as an additional charge to the buyer during a future financial transaction conducted through the payment processing system, e.g., at the same merchant or at another merchant that uses the payment processing system.

In some examples, the service computing device may generate one or more machine learning models, and may use at least a portion of the information maintained in the transaction information data structure to train the machine learning model for determining buyer eligibility for receiving financing and/or for determining custom financing terms to offer to the buyer. The determination of whether a buyer qualifies for a financing offer can be based on a credit worthiness determination and/or on an evaluation of the buyer's previously conducted financial transactions (including past financing) conducted through the payment processing system and/or based on the an evaluation of the merchant from whom the item is to be purchased and/or an evaluation of similar merchants that use the payment processing system. For example, over the previous year, the buyer may have conducted financial transactions through the payment processing system that total $25,000 in payment volume. Based on this payment volume and various other factors associated with the buyer, a determination might be made to offer the buyer financing terms for purchasing a specified item. Additionally, in some cases, when access is permitted by the buyer, the buyer's bank account balance and bank account transaction history may be included as a consideration when determining whether the buyer qualifies for financing.

Further, in some implementations, the buyer device may include a wallet application or other payment application that stores or accesses the financing payment code provided to the buyer for the financing. The payment application may communicate with the POS terminal of the merchant during the purchase transaction such as wirelessly through a card reader (e.g., a combination payment card reader and wireless reader) connected to the POS terminal. The POS terminal may automatically detect the financing payment code for the financing instead of a different payment card number stored by the payment application, and may use the financing payment code for receiving payment for the transaction. As one example, the POS terminal may have previously received the financing payment code from the service computing device, such as when the financing for the buyer was approved by the service computing device. In one example, the financing payment code represents a virtual account number that is specific to the merchant, the buyer, the item(s) to be purchased, and approved financed amount. For instance, as one example, the financing payment code can only be used by the approved buyer at the designated merchant for purchasing the selected item(s) for the approved financed amount. In other examples, the financing payment code may be used by the approved buyer at the designated merchant for purchasing any item(s) offered by the designated merchant at a purchase price up to the approved financed amount.

In some examples, the merchant application on the POS terminal may recognize a portion of the financing payment code (e.g., the first four, five, or six digits) as indicating the code is a financing payment code for financing issued by the payment processing system. Based on this determination, the POS terminal may send the detected code to the service computing device to determine the amount of financing approved for use by the buyer, whether the financing offer has expired, and in some cases, the item for which the financing was requested. In some examples, if the transaction price is less than or equal to the authorized financing amount, and the offer has not yet expired, the service computing device may provide authorization to the POS terminal to proceed with the transaction as a financed transaction based on the received payment code. Additionally, the buyer may provide a financial account to the payment processing system, such as by providing debit card information, to facilitate repayment of the approved financing amount. In this way, the payment code or virtual account number serves to effectively transform the debit card into a financed payment instrument.

As another example, the merchant may include machine-readable indicia, such as a matrix barcode, 2-D barcode, Quick Response code, or the like, on the pricing label for an item, advertising for the item, or other documentation or signage associated with the item. Upon scanning the machine-readable indicia, the buyer's device may be directed to the financing UI to enable the buyer to apply for financing for the item. For example, a browser or a dedicated barcode scanning application on the buyer device may be directed to a website that provides the financing UI, at which point to the user may proceed with applying for financing to purchase the item from the merchant without interacting with the merchant until the financing is approved.

In addition, after a buyer has already completed an application for receiving financing from one merchant in the distributed network, the buyer may be automatically offered financing for other eligible merchants in the distributed network. For example, the buyer may be shopping at a merchant location and may use the buyer application on the buyer device to, e.g., scan a UPC barcode of an item at the merchant location. The buyer application may send the barcode information and GPS (Global Positioning System) coordinates of the buyer device to the service computing device, thus providing an indication of the item and the item location.

In response, the service computing device may identify the merchant based on the GPS location of the buyer/item. In addition, based on the barcode information, the service computing device may determine the merchant's price for the item from a merchant data structure, and may determine that the buyer qualifies for financing for the item based on the techniques discussed above without the buyer having to complete another application. The service computing device may send information to the buyer device to cause the buyer application on the buyer device to present the price of the item and an indication of an offer for financing the purchase of the item from the merchant. Additionally, or alternatively, rather than scanning a barcode, the buyer may use any other technique for identifying an item and merchant location, such as sending a photo of an item, sending a manually entered UPC number, or the like. Furthermore, in some cases, before financing is granted, the system may perform a check of the identity of the person using the buyer device to minimize fraud and engender customer trust, such as by requiring a password, receiving biometric information, or the like.

As still another example, the buyer may be offered financing automatically during checkout at eligible merchants. For example, suppose that the buyer was previously approved for financing for a first merchant, but never used the approved financing. Furthermore, suppose that the buyer is making a purchase at a second merchant that uses the payment processing service, and that the second merchant has been determined to be a merchant for which buyers are able to obtain financing. When the buyer offers a payment card for payment of the purchase, the payment processing system may recognize the buyer based on the payment card information and may determine that the buyer previously completed a request for financing, was approved, but did not use the financing. Accordingly, the payment processing system may determine that the buyer is still eligible for financing, and may determine that the total current transaction amount is within an approved amount for the buyer. Based on this, the payment processing system may present an offer for financing the amount of the current transaction to the buyer, e.g., on a buyer facing display, along with terms for the financing customized based on the analysis of the buyer and the current merchant. If the buyer accepts the financing offer, the buyer may be asked to select a number of payments and to further select whether the buyer would like the payments to be made manually or automatically. Following these selections, the buyer may complete the transaction entirely through the offered financing. In the event that the purchase amount of the transaction at the POS terminal is less than the approved financed amount, the balance of the approved financed amount for the buyer may be automatically reduced by the payment processing system to correspond with the actual purchase amount.

In some examples, a service provider may provide a payment processing service that enables merchants to conduct transactions with buyers at respective POS locations. In the examples herein, a transaction may include a financial transaction for the acquisition of goods and/or services (referred to herein as "items") that is conducted between a buyer (e.g., a customer) and a merchant, such as at a POS location or online. Further, a merchant may include any business or other entity engaged in the offering of items for acquisition by buyers in exchange for compensation received from the buyers. Actions attributed to a merchant herein may include actions performed by employees or other agents of the merchant and, thus, no distinction is made herein between merchants and their employees/agents unless specifically discussed. In addition, as used herein, a buyer may include any entity that acquires items from a merchant, such as by purchasing, renting, leasing, borrowing, licensing, or the like. Buyers may be customers or potential customers of a particular merchant. Thus, a merchant and a buyer may interact with each other to conduct a transaction in which the buyer acquires one or more items from a merchant, and in return, the buyer provides payment to the merchant.

Examples herein improve on conventional technique by employing machine learning to provide proximate intelligent early underwriting of consumer financing based on determining buyer purchase behavior, merchant inventory information, and/or merchant point-of-sale (POS) activity. The implementations herein enable financing at a merchant location in real-time or near-real-time. Accordingly, a transaction that includes obtaining financing, such as when a consumer elects to finance a purchase at a POS terminal, may be performed faster and more conveniently than in conventional techniques. For example, the system herein may utilize different types of information and new eligibility-determination techniques that are unknown in the field of the invention. Furthermore, in some examples, the system herein provides interactive user interfaces with a buyer application that enables new functionality for buyers to obtain on-the-spot financing at a merchant location before or during a transaction to purchase a selected item. Further, examples herein employ a distributed system of merchant devices and buyer devices with respective interactive user interfaces that provide technical improvements to the overall payment processing system by enabling quick and automated access to financing for use in the payment processing system.

For discussion purposes, some example implementations are described in the environment of a distributed system including a plurality of merchant devices and a plurality of buyer devices in communication with one or more service computing devices. However, implementations herein are not limited to the particular examples provided, and may be extended to other service environments, other system architectures, other techniques for communicating with buyers and/or merchants, and so forth, as will be apparent to those of skill in the art in light of the disclosure herein.

FIG. 1 illustrates an example distributed system 100 according to some implementations. The system 100 includes one or more service computing devices 102 of a payment processing system operated by a service provider 104 that may communicate over one or more networks 106 with a plurality of buyer devices 108 (1), 108(2), . . . , and a plurality of merchant devices 110(1), 110(2), . . . . The one or more networks 106 can include any appropriate network, including a wide area network, such as the Internet; a local area network, such an intranet; a wireless network, such as a cellular network; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail. Accordingly, the service computing device 102, the buyer devices 108, and the merchant devices 110 are able to communicate over the one or more networks 106 using wired or wireless connections, and combinations thereof.

Each buyer device 108(1), 108(2), . . . , may be associated with a respective buyer 112(1), 112(2), . . . , and each merchant device 110(1), 110(2), . . . , may be associated with a respective merchant 114(1), 114(2), . . . . In some examples, merchants 114(1), 114(2), . . . , may each offer one or more respective items 116(1), 116(2), . . . , which, as mentioned above may be a good or service offered for sale, lease, or the like. Each merchant device 110(1), 110(2), . . . , may include a respective instance of a merchant application 118(1), 118(2), . . . , which, when executed on the respective merchant device 110, configures the merchant device 110 as a particular machine for performing as a point-of-sale (POS) terminal. For example, the merchant application 118 enables the respective merchant 114 to use the merchant device 110 as a POS terminal for conducting transactions for the sale of items 116 to buyers 112. For instance, the first merchant 114(1) may use the first merchant device 110(1) to accept a payment from the first buyer 112(1).

The merchant application 118 may further enable the merchant 114 to communicate with the service computing device 102. For example, the merchant application 118 may include a dashboard program (not shown in FIG. 1) that enables the respective merchant 114 to upload merchant information such as item pricing information, item descriptions, inventory information, and the like, to the service computing device 102. Each merchant 114(1), 114(2), . . . , and respective merchant device 110(1), 110(2), . . . , may be associated with a respective merchant location 120(1), 120(2), . . . , which may typically be the merchant's place of business, and which may also be referred to herein as a POS location.

In addition, the buyer devices 108(1), 108(2), . . . , may execute respective instances of buyer applications 122(1), 122(2), . . . . For example, buyers 112 may use the buyer devices 108, such as smart phones, tablet computers, wearable computing devices, laptops, desktops, or the like, and these buyer devices 108 may have installed thereon the buyer application 122. In some examples, the buyer application 122 may include a browser, or the like, and the buyer 112 may navigate to a website or other URL associated with the service provider 104 to obtain financing. In this case, the buyer 112 may use a financing UI received via the URL associated with the service provider 104 to obtain financing and/or to perform other functions described herein. Accordingly, the financing UI received from the service provider 104 may provide at least some of the functionality attributed to the buyer application 122 herein. In other examples, the buyer application 122 may be a dedicated or proprietary payment application, which may be provided by the service provider 104, such as for making payments to the merchants 114 that include merchant devices 110 executing an instance of the merchant application 118.

In the example of FIG. 1, suppose that the first buyer 112(1) is conducting a transaction with the first merchant 114(1) to purchase an item 116(1) at the first merchant location 120(1). The instance of the merchant application 118(1) executing on the first merchant device 110(1) may send transaction information 126 to the service computing device 102. In some examples, the transaction information 126 may be sent by the merchant application 118 executing on the merchant device 114 as the corresponding transaction is being conducted at the respective merchant location 120. For instance, the transaction information 126 may be sent by each of the merchant devices 110 as each transaction is conducted. Of course, in other examples, such as if the merchant is processing transactions offline, the transaction information 126 may be sent in a batch at a subsequent point in time or using other suitable techniques.

The transaction information 126 may include information regarding the time, place, and the amount of the transaction, information related to the item acquired, a type of payment instrument being used (e.g., cash, check, payment card, electronic payment), as well as additional information, such as buyer information. For instance if a payment card, such as a credit card or debit card, is used, the transaction information 126 can include data stored in the payment card, e.g., Track 1 data (cardholder name, card number, and other card information). In addition, when completing the transaction a buyer 112 may sometimes provide a receipt email address for receiving a receipt through an email address associated with the buyer. Accordingly, it is often possible to positively match a particular buyer to a transaction, and then associate the transaction with a buyer profile for the particular buyer that might be maintained by the service computing device 102. Additionally, in some cases, the buyer may be identified and matched to a transaction and/or buyer profile through the buyer device 108 and/or through the buyer application 122 on the buyer device.

Other examples of transaction information 126 that can be captured include item information, e.g., an itemized listing of the items being acquired, the price being paid for each item, descriptors of the items (size, flavor, color, etc.), geolocation data indicating a geographic POS location of a particular transaction, online/offline card data, data describing the merchant, e.g., a merchant identifier, a merchant category code (MCC), data describing the merchant employee, if any, such as an employee logged in to the merchant device, any type of data that is received upon a buyer's authentication into a social network, if any, and various other types of information, as discussed additionally herein.

The service computing device 102 may also receive transaction information 126 from the plurality of other merchants 114. For example, a large number of other merchants 114 may also operate their own merchant devices 110, respectively, for conducting transactions with respect to their own businesses. Accordingly, transaction information 126 from the merchant devices 110 associated with the plurality of merchants 114 may be provided to the service computing device 102 for payment processing and storage.

The service computing device 102 may include a payment processing program 130 that may receive the transaction information 126 from individual merchant devices 110 and may process the payments for the merchants 114, such as by authorizing payment card transactions, crediting a corresponding merchant account for payment card purchases, keeping track of cash and check purchases for accounting purposes, and so forth. For example, the payment processing program 130 may receive transaction information 126 and may verify that a proffered payment card can be used to pay for the transaction, such as by contacting a card clearinghouse computing device or other bank computing device (not shown in FIG. 1). In some examples, the payment processing program 130 may redirect payment information for transactions to be made using a payment card to a bank computing device (not shown in FIG. 1), while in other examples, the merchant devices 110 may communicate directly with an appropriate bank computing device for approving or denying a transaction using a particular payment card for a particular transaction.

Furthermore, the payment processing program 130 may store the transaction information 126 in a transaction information data structure 132. In this example, the transaction information data structure 132 may encompass or otherwise include a merchant information data structure 134 that includes merchant profiles 136 and a buyer information data structure 138 that includes buyer profiles 140. For example, the transaction information 126 received from the first merchant 114(1) may be associated with a merchant profile 136 corresponding to the first merchant 114(1), transaction information 126 received from the second merchant 114(2) may be associated with a merchant profile 136 corresponding to the second merchant 114(2), and so forth.

In addition, buyer information extracted from the transaction information 126 may be stored in the buyer information data structure 138 and may be associated with a corresponding buyer profile 140. For example, the transaction information 126 for a particular transaction may include a payment card identifier of the payment card that was used as a payment instrument, and may further include the name of the cardholder of the payment card that was used. Accordingly, a buyer profile 140 may be associated with the payment card number or other identifier of the payment card and/or with the name corresponding to the cardholder of the payment card. Additional transaction information 126 may be related to this buyer profile 140, such as the merchant location of the transaction, the name of the merchant, the amount of the transaction, the time and date of the transaction, the item(s) acquired through the transaction, descriptive information about the item(s) acquired, the individual price paid for each item, and so forth.

The service computing device 102 may include a financing program 142 that may analyze information in the transaction information data structure 132, such as in the merchant information data structure 134 and/or the buyer information data structure 138 for determining whether to offer financing to one or more of the buyers 112, and if so, the financing amount and other terms, such as in response to a buyer request for financing. In some implementations, the financing program 142 may apply one or more buyer-eligibility machine learning models (MLMs) 144 when determining buyer eligibility and terms for financing. In addition, the financing program 142 may apply one or more merchant-eligibility MLMs 146 when determining eligible merchants 114 at which the service provider 104 is willing to offer financing to buyers.

Furthermore, the financing program 142 may apply one or more transaction-eligibility MLMs 148 when determining whether a particular transaction is eligible for being financed. For example, even if the buyer is eligible and the merchant is eligible, the transaction might not be eligible. For instance, the transaction might be for too small an amount, too large an amount, or may be for a type of item for which it is not desirable to offer financing, such as a gift card.

As one example of the financing techniques herein, suppose that a second buyer 112(2) uses the buyer device 108(2) to submit a request for financing 150 to the service computing device 102. In the example of FIG. 1, suppose that the second buyer 112(2) has selected an item 116(2) as an item that the second buyer 112(2) would like to purchase from the second merchant 114(2) using financing. Furthermore, suppose based on analysis of the transaction information in the transaction information data structure 132 that the financing program 142 has determined that the second merchant 114(2) is eligible for its customers to receive financing from the service provider 104. For example, as discussed additionally below, only some of the merchants 114 may be determined by the financing program 142 to be eligible for having their customers receive financing from the service provider 104, as determined e.g., from analysis of the transaction information in the transaction information data structure 132.

As discussed additionally below, the service computing device 102 may receive the request for financing 150 from the second buyer device 108(2), such as via a financing UI presented on the second buyer device 108(2). Upon receiving the request for financing 150, and based on the information included therein, the financing program 142 may associate the second buyer 112(2) with an existing buyer profile 140, if such exists. For example, the service computing device 102 may have a buyer profile 140 for the second buyer 112(2) based on past transactions conducted with the merchants 114, even though the second buyer 112(2) may have never applied for financing with the service provider 104.

The buyer profile 140 may include the transaction history of the second buyer 112(2) for transactions not only with the current merchant 114(2), but also with other merchants 114, including merchants 114 that are categorized similarly to the current merchant 114(2). As one example, merchants 114 may be categorized to be similar to other merchants 114 based on an MCC (Merchant Category Code) provided by the merchant to the service provider 104 when the merchant begins participating in the payment processing system. The MCC is a four-digit number used to classify a business by the type of goods or services it provides.

In addition, in some cases, buyer information may be determined about the buyer 112(2) if the buyer 112(2) uses the buyer application 122(2) and the buyer application 122(2) is proprietary application associated with the service provider 104. In this case, the buyer 112(2) may be identified through the buyer profile 140 associated with the buyer application 122(2). As another example, if the buyer 112(2) has used a particular payment card, such as a credit card or debit card, for a past transaction with one or more of the merchants 114, the payment processing program 130 may receive the information from the payment card, such as a payment card number or other identifier and the name of a cardholder of the payment card. As still another example, if the buyer 112(2) pays for a transaction with an electronic wallet or other third-party payment application, the buyer's name, payment card information, and other information may be determined as part of the transaction information. As still another example, if the merchant provides a club card or membership incentives, the buyer 112(2) may provide identifying information to participate in such a program, which information may be on file with the merchant, and which may include identifying information such as a phone number, name, or the like. As still another example, if the buyer 112(2) has used a check or similar payment instrument in the past for a transaction with one of the merchants 114, that transaction may have been matched to the buyer's profile 140 based on the buyer information received with the check.

In the scenarios listed above, disconnected sets of transaction information can make it difficult to capture an overall view of a buyer's past transactions. Thus, in some examples herein, various techniques may be used for matching transaction information corresponding to multiple different payment instruments to a single buyer profile 140. This enables creation of a single or more complete buyer profile 140 to describe the shopping behavior of the corresponding particular buyer. In some examples a probabilistic model, or the like, may be used to determine within a threshold level of confidence that transaction information from a particular transaction should be associated with a particular buyer profile 140. Furthermore, if an existing buyer profile 140 that matches the financing request information cannot be located, a new buyer profile 140 may be created.

In this example, suppose that the buyer 112(2) completes the request for financing 150 using a financing UI, as discussed additionally below, and the request for financing 150 includes buyer information, such as name, address, phone number, debit card information, email, and the like, that enables the financing program 142 to associate the request for financing 150 with a particular buyer profile 140. Accordingly, the financing program 142 may access a transaction history in the buyer profile 140 when determining whether to offer financing to the particular buyer 112 and/or when determining the terms of the financing. In some examples, the past transaction information of the buyer 112(2) may be used as input to the one or more buyer-eligibility MLMs 144 for determining whether to offer financing to the buyer 112(2), and if so, for determining the terms of the financing. In addition, in some examples, as mentioned above, financing may be offered only at certain merchants of the plurality of merchants 114, as determined, e.g., based on analysis of the merchants using the merchant-eligibility MLM(s) 146 and for certain transactions.

Upon receipt of the request for financing 150, the financing program 142 may initially check that the request is for financing an item at an eligible merchant at which financing has been determined to be available based, e.g., on the analysis of the merchant using the merchant-eligibility MLM(s) 146. If not, the request for financing 150 may be refused. In addition, the financing program 142 may check whether the transaction is eligible for financing, e.g., based on analysis of the selected item and purchase price using the transaction eligibility MLM(s) 148. If not, the request for financing 150 may be refused.

If the merchant is eligible and the transaction is eligible, the financing program 142 may employ the one or more buyer-eligibility MLMs 144 to determine buyer eligibility and financing terms. For example, the financing program 142 may use as input the information in the buyer profile 140 of the buyer 112(2), the information in the request for financing 150, information about the second merchant 114(2), e.g., from the merchant profile 136 for the second merchant 114(2), and, in some cases, information about other merchants classified or otherwise determined to be similar to the second merchant 114(2).

Based on the outcome of the one or more buyer-eligibility MLMs 144, suppose that the financing program 142 determines that the buyer 112(2) is eligible for financing for the price of the item 116(2) plus tax, i.e., the purchase price. Accordingly, the financing program 142 may send financing UI information 152 to the buyer device 108(2). For example, the financing UI information 152 may include the terms of the financing, the approved amount of the financing, and a request for the buyer to select repayment terms, such as number of months, and whether payments are to be automatically deducted from a buyer account by charging a debit card. In response, the buyer 112(2) may reply with an indication of acceptance 154 of the offered terms and amount, such as by providing debit card information, and selecting a repayment method, and so forth. In response to the indication of acceptance 154, the financing program 142 may send a financing payment code 156 to the buyer device 108(2). In this example, the buyer 112(2) does not owe any money to the service provider 104 until after the financing payment code 156 is actually used for a transaction at the specified merchant 114(2).

As mentioned above, in some examples, the financing payment code 156 may be used only at the specified merchant 114(2), and in some cases, only for the specified item 116(2), or another item in the same item category as the specified item. For instance, in the case of item categories, the merchant or the service provider may classify items into item categories, such as mattresses, televisions, etc., and in some cases into subcategories based on similar monetary value. Thus, in some examples, if the buyer obtains financing for a mattress, the buyer may be limited to using the financing for the specified mattress or a different mattress, i.e., in the same item category. In other examples, however, the financing payment code may be used for any item offered by the specified merchant 114(2), but may not be used at other merchants 114. For example, if the buyer 112(2) attempts to use the financing payment code 156 at the first merchant 114(1), the transaction may be refused as not being authorized by the financing program 142. Furthermore, the offer for financing, and hence, the financing payment code 156, may expire after a predetermined period of time, such as three days, one week, 10 days, two weeks, and so forth.

In some examples, the financing payment code 156 may be a 16-character string that represents the agreement for the financing to the buyer 112(2) for making a purchase from the merchant 114(2). Further, in some cases, the first six characters may serve as an indicator that the financing payment code 156 is a financing code and not a regular credit card number, or the like. Thus, the merchant application 118(2) executing on the merchant device 110(2) may be able to recognize the financing payment code 156 as a financing code, and may determine whether the payment code 156 matches a payment code received from the service computing device 102 based on the financing for the buyer 112(2) being approved. For example, upon generation of the financing payment code 156 following the indication of acceptance 154 from the buyer 112(2), the financing program 142 may send financing information 160 to the merchant application 118(2) on the merchant device 110(2), which may include the financing payment code 156, as well as other identifying information about the second buyer 112(2), e.g., name or verification credentials, such as password, biometric information, a security code associated with the financing payment code 156, or the like.

Alternatively, in other examples, the financing program 142 does not send the financing payment code 156 to the merchant device 110(2). Instead, when the merchant application 118(2) recognizes that the buyer 112(2) has a financing payment code 156 for financing, the merchant application 118(2) may send the financing payment code 156 to the service computing device 102, and the financing program 142 may determine if the received financing payment code 156 can be used for the current transaction. Furthermore, in some examples, APPLE PAY®, GOOGLE wallet, or other payment applications may be used to hold the financing payment code until used, as discussed additionally below.

Additionally, or alternatively, in some examples, upon receiving the indication of acceptance 154, the financing program 142 may add the second buyer 112(2) as a new customer to a merchant-customer directory 162 provided by the payment processing program 130 to respective merchants as a listing of the customers that have performed transactions with the respective merchant. For instance, even though the second buyer 112(2) may not yet have performed any transactions with the second merchant 114(2), the second buyer 112(2) may be added to the merchant-customer directory 162 of the second merchant 114(2) based on the approval and acceptance of the financing. The second buyer 112(2) can then provide identification to the second merchant 114(2) at the merchant location 120(2) when purchasing the item 116(2), and may inform the second merchant 114(2) that the second buyer 112(2) is pre-approved for financing at the second merchant 114(2). The merchant 114(2) can then look up the second buyer 112(2) in the directory 162 and determine the amount for which the buyer 112(2) is pre-approved without the second buyer 112(2) having to produce the financing payment code 156. In some examples, the buyer may provide proof of identity, such as phone number, email address, government-issued identity card, biometric information, the financing payment code, or the like, and the merchant 114(2) may use this information to locate and verify the pre-approval of the financing for the buyer 112(2).

The transaction information data structure 132, including the buyer information data structure 138 with the buyer profiles 140 and the merchant information data structure with the merchant profiles 136 described herein may be created and maintained using any suitable types of data structures, and using any suitable data storage or database techniques. For instance, the transaction information and other profile information may be maintained in a relational database in which, for example, pieces of information for individual buyer profiles may be stored discretely from each other, but are related to or otherwise associated with each other in the relational database. For instance, a particular buyer profile 140 may be obtained by generating a view of a portion the data related in the database to the particular buyer profile 140, or by otherwise extracting the data from the database. Alternatively, of course, other types of storage techniques and data structures may be used for storing the transaction information, and for generating and maintaining the buyer profiles 140 and/or the merchant profiles 136.

Figure 2:
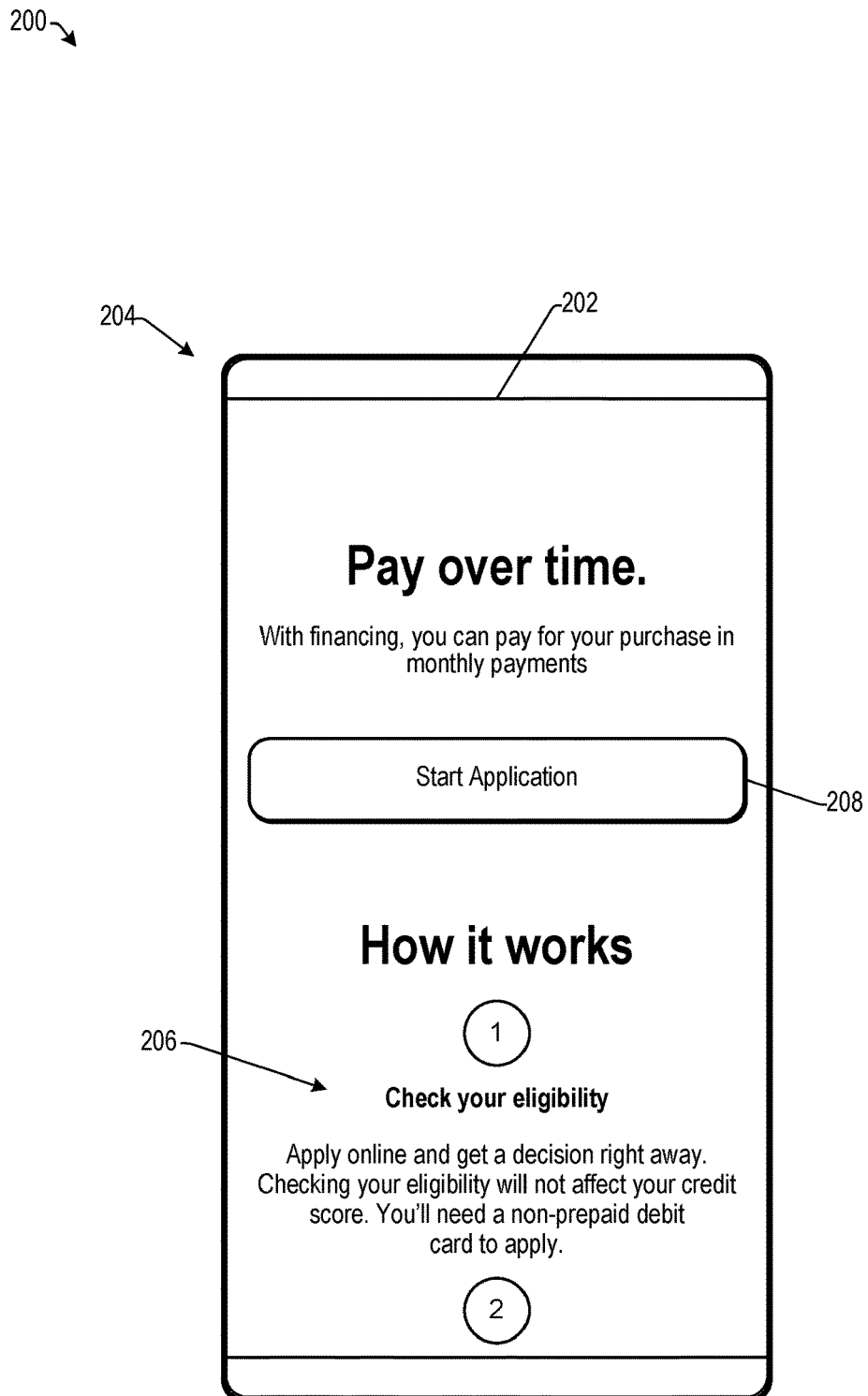
FIG. 2 illustrates an example financing UI portion that may be presented on a display according to some implementations.

FIG. 2 illustrates an example financing UI portion 200 that may be presented on a display according to some implementations. In the illustrated example, the financing UI portion 200 is shown as being presented on a display 202 associated with an electronic device 204. In some examples, the electronic device 204 may include the buyer device 108 discussed above with respect to FIG. 1. In other examples, the electronic device 204 may include the merchant device 110 discussed above with respect to FIG. 1, or other suitable computing device. The financing UI portion 200 may present a financing offer and introduction to the buyer and may be navigated by the buyer to enable the buyer to provide buyer information to the service provider (e.g., through a touch screen interface) for determining buyer eligibility for the financing offer.

In some examples, the buyer may navigate to the financing UI 200 such as in response to an advertisement or signage at the merchant location or elsewhere, a recommendation from the merchant, receiving an email, or the like. For example, in the case that the buyer application discussed above includes a browser, the buyer may navigate the browser to a URL or the like that causes the financing UI portion 200 to be presented on the display 202.

In other examples, the buyer may navigate to the financing UI portion 200 by scanning a 2-D barcode or other machine-readable indicia, such as on a label or sign associated with an item that the buyer is interested in purchasing. In still other examples, the buyer may navigate to the financing UI portion 200 through an application provided by the service provider 104. In still other examples, the financing UI portion 200 may be presented to the buyer by the merchant on a buyer facing display of the merchant device presented to the buyer during a transaction for purchasing the item. Numerous other variations will be apparent to those of skill in the art having the benefit of the disclosure herein.

The financing UI portion 200 includes a description 206 of the financing offered and the actions to be performed during the financing application process. In addition, the financing UI portion 200 includes a selectable "start application" button or other virtual control 208 that may be tapped on or otherwise selected by the buyer to initiate the process for requesting the financing. Accordingly, the payment processing service may provide a buyer-facing interface to enable the buyer to request financing, e.g., while at a merchant location, in a private and discreet manner. Thus, the distributed system herein enables buyers to easily obtain financing for an item to be purchased in-store while at the POS location in a real-time manner, or prior to going to the store.

In some examples, the buyer may request financing for making a purchase from a specified merchant (e.g., while in the specified merchant's store or prior to visiting the specified merchant's store). The financing program may determine the buyer's eligibility for financing and may determine custom financing terms for the buyer based on analysis of transaction information from a plurality of past transactions between a plurality of buyers and a plurality of merchants, which may include the specified merchant and/or other similar merchants. For instance, as discussed additionally below, the eligibility and/or financing terms may be determined based on the past purchase activity of the buyer at the specified merchant or similar merchants, and/or based on the purchase activity of other buyers at the specified merchant and/or at similar merchants. Based on analysis of this information, the service computing device may generate a custom financing offer for the requesting buyer.

Figure 3:
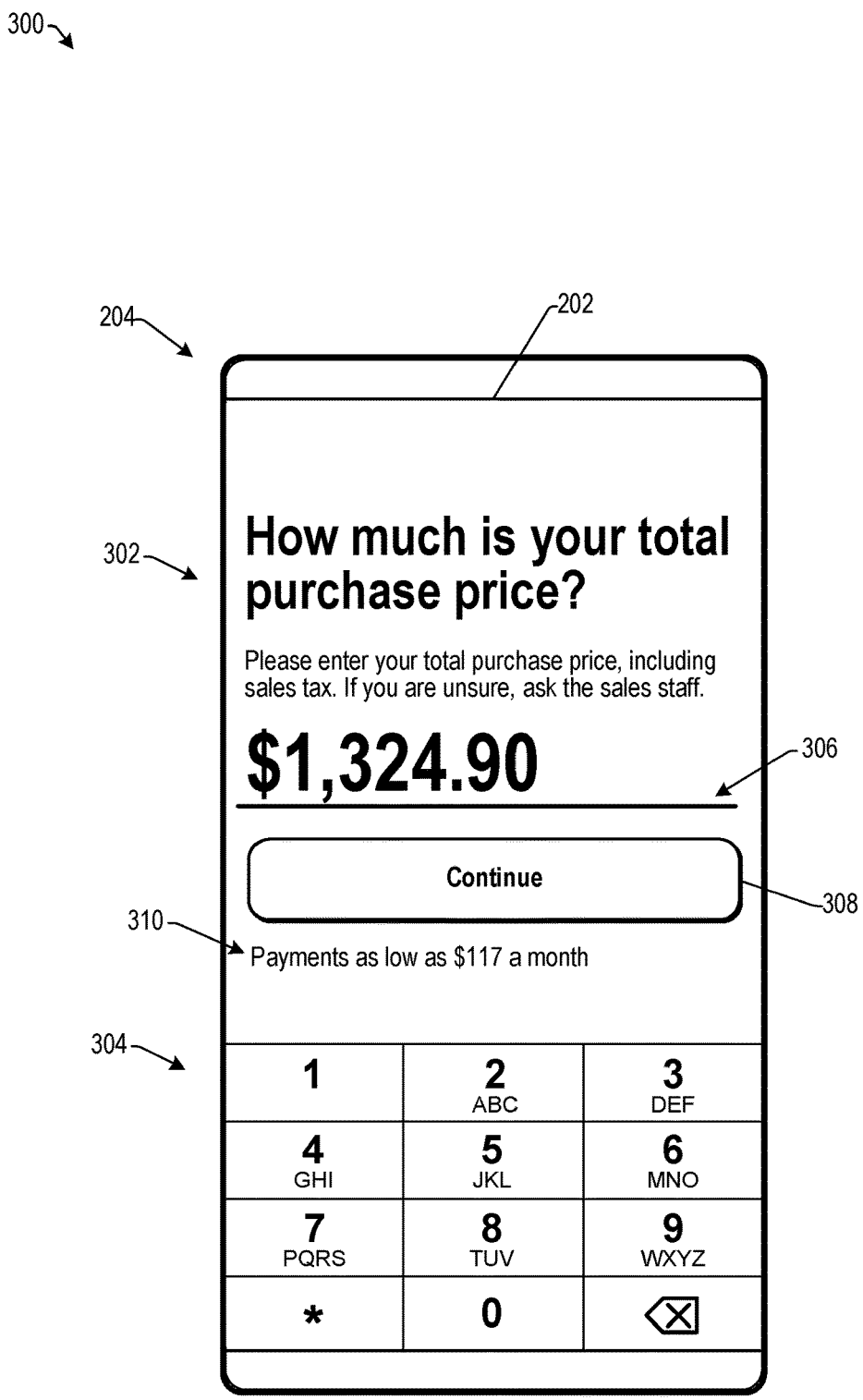
FIG. 3 illustrates an example financing UI portion that may be presented on the display according to some implementations.

FIG. 3 illustrates an example financing UI portion 300 that may be presented on the display 202 according to some implementations. In the example of FIG. 3, the financing UI portion 300 may be presented on the display 202 in the situation in which the buyer has determined to proceed with requesting financing, e.g. by selecting the "start application" virtual control 208 discussed above with respect to FIG. 2. The financing UI portion 300 includes a request 302 for the total purchase price, a virtual keypad 304 to enable the buyer to enter the total purchase price, and an entry space 306 at which the total purchase entered price is displayed. In addition, the financing UI portion 300 includes a "continue" virtual control 308 that the buyer may select to continue to the next UI portion. The financing UI portion 300 may further present an estimate of the lowest monthly payments that will be offered based on the entered purchase price, as indicated at 310.

Furthermore, in other examples, the financing program may determine the tax and/or the price of the item. For instance, the buyer may scan a barcode or take a photo of a label associated with the item or may manually enter a UPC number, and the financing program may determine the price and tax as the total purchase price for the item. For example, the financing program may access the merchant information data structure that maintains the prices of items offered by the specified merchant and the sales tax to be charged at the merchant's location. The financing program may use the item price plus tax as the purchase price to be financed.

As another example, the item price and tax may be sent to the buyer device from the merchant device, such as via an electronic communication. For instance, suppose that the buyer is conducting a purchase with a merchant at a POS terminal. The merchant may ask if the buyer would like to finance the purchase, and upon receiving an affirmative response from the buyer, may use the merchant device to send the electronic communicate to the buyer device, such as by SMS text message, email, or the like. The electronic communication may include the purchase price and a link, URL, or other interactive feature to enable the buyer to access the financing UI.

Figure 4:
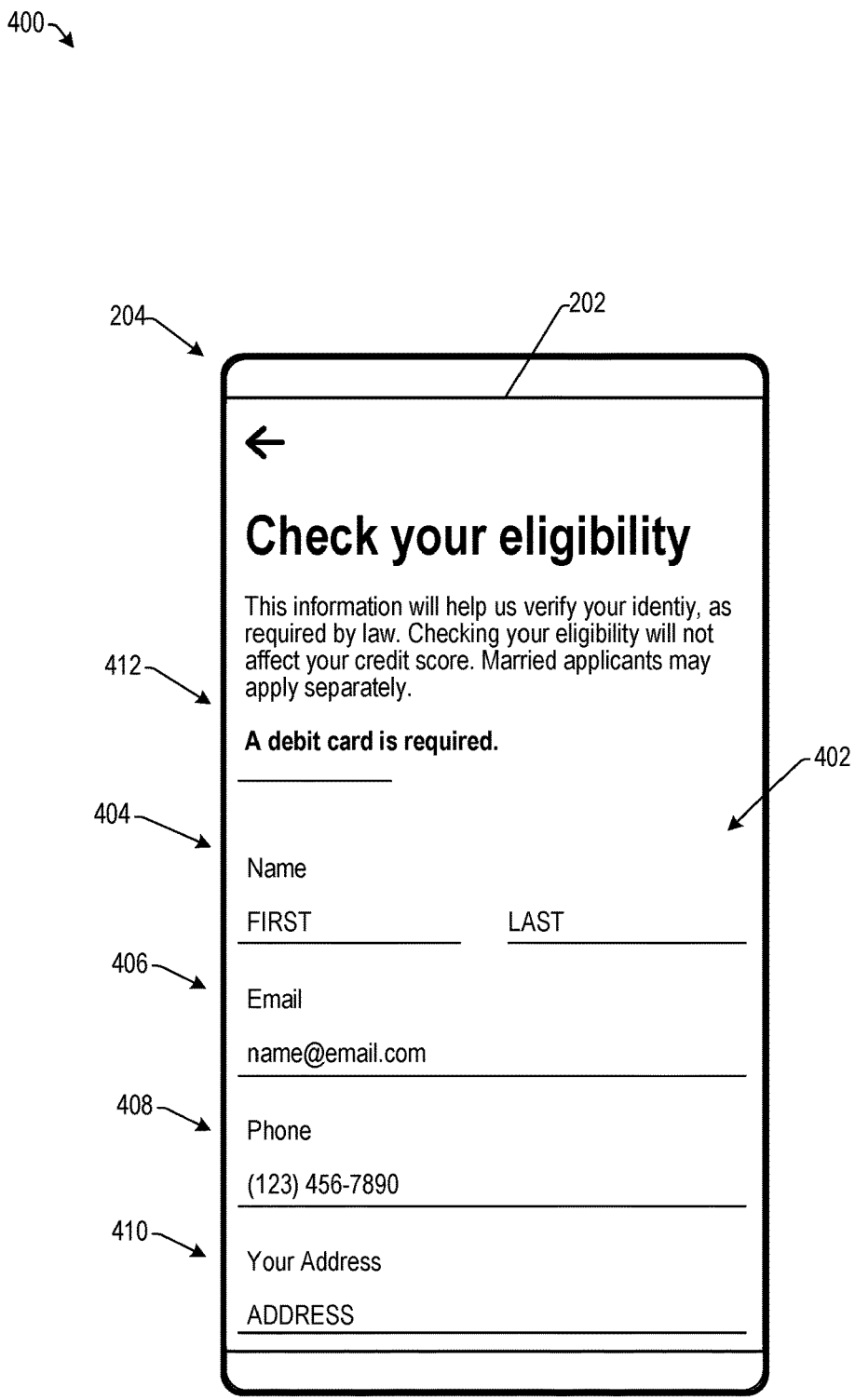
FIG. 4 illustrates an example financing UI portion that may be presented on the display according to some implementations.

FIG. 4 illustrates an example financing UI portion 400 that may be presented on the display 202 according to some implementations. In the example of FIG. 4, financing UI portion 400 may be presented in the situation in which the buyer has entered the total purchase price and selected the "continue" virtual control 308 discussed above with respect to FIG. 3. The financing UI portion includes a form 402 for the buyer to enter personal information including first and last name 404, email address 406, phone number 408, and address 410. In some cases, if the buyer has previously applied for financing, this information might not be requested again. Instead, the buyer may be asked to provide identifying credentials, such as username/password, biometric information, or the like. Additionally, in some cases, the buyer may be able to authenticate with a third party service, website, social network, or the like, to have the information filled in, rather than manually entering the information.

In addition, the financing UI portion 400 may include a notice 412 that a debit card is required for the buyer to obtain the financing. Following completion of the personal information, the request for financing may be processed by the service computing device to determine the eligibility of the buyer to receive financing. In some examples, the financing UI may be configured to first request the debit card information from the buyer before indicating that the buyer is eligible for financing, while in other examples, the debit card information may be obtained after determining that the buyer is otherwise eligible to receive the financing. In either event, however, the buyer typically is not approved for receiving the financing until after the debit card information has been provided.

The financing UI may also ask for other information not shown in this example. For instance, additional personal information may be requested to verify the buyer's identity. As another example, bank account information may be requested to deter fraudulent activity and determine ability to pay.

Figure 5:
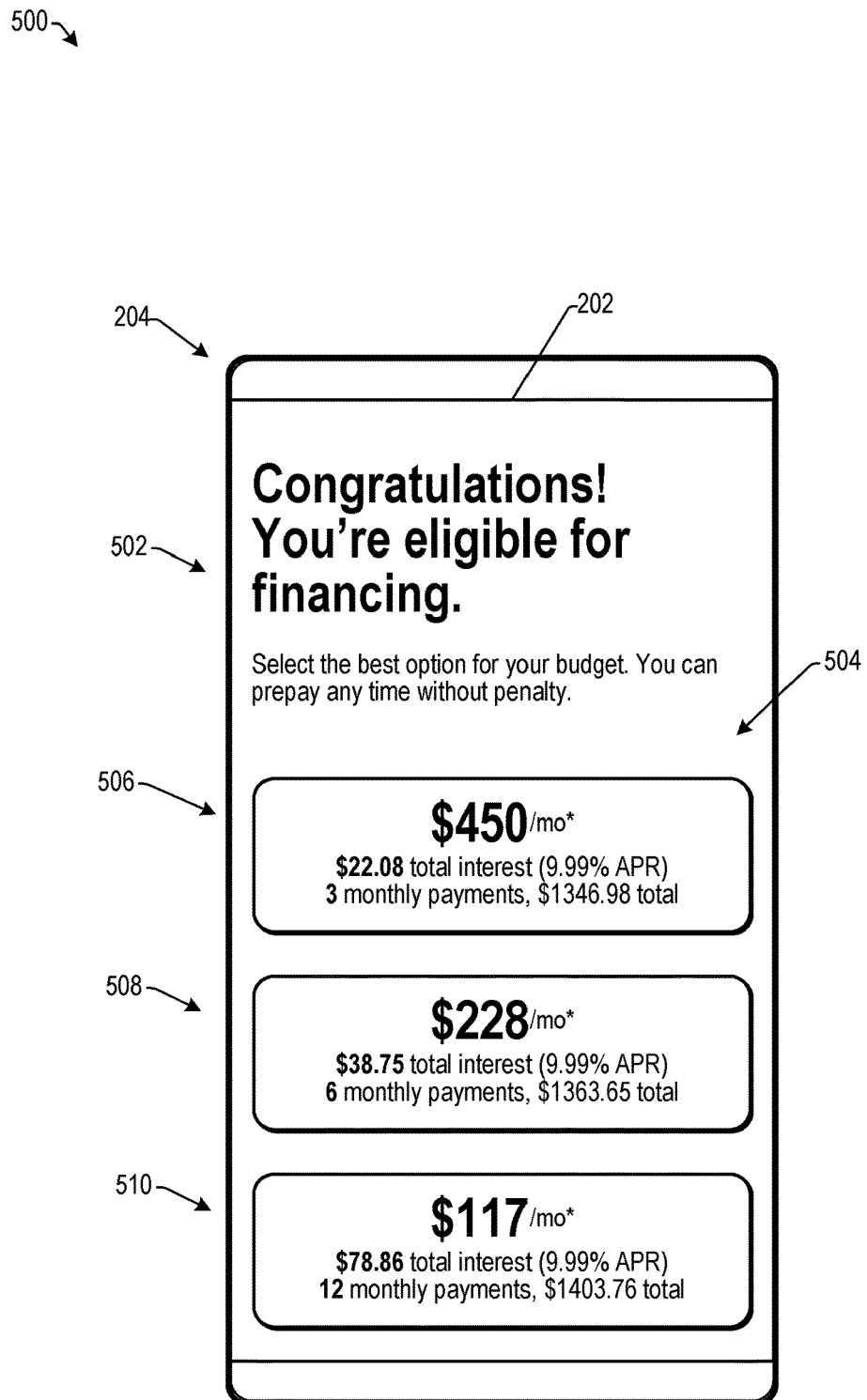
FIG. 5 illustrates an example financing UI portion that may be presented on the display according to some implementations.

FIG. 5 illustrates an example financing UI portion 500 that may be presented on the display 202 according to some implementations. In the example of FIG. 5, financing UI portion 500 may be presented on the display 202 following submission of the personal information discussed above with respect to FIG. 4. The financing UI portion 500 includes one or more customized financing offers that may be presented to the buyer either before or after the debit card information is obtained from the buyer and, as indicated at 502, informs the buyer that the buyer is eligible for financing, although final approval may be withheld until the buyer's valid debit card information is received. Furthermore, as indicated at 504, the financing UI portion 500 includes three options for repayment of the financing e.g., three monthly payments as indicated at 506, six monthly payments as indicated at 508, or 12 monthly payments as indicated at 510. Accordingly, the buyer may tap on or otherwise select one of the repayment options 504 to proceed with the financing request.

Figure 6:
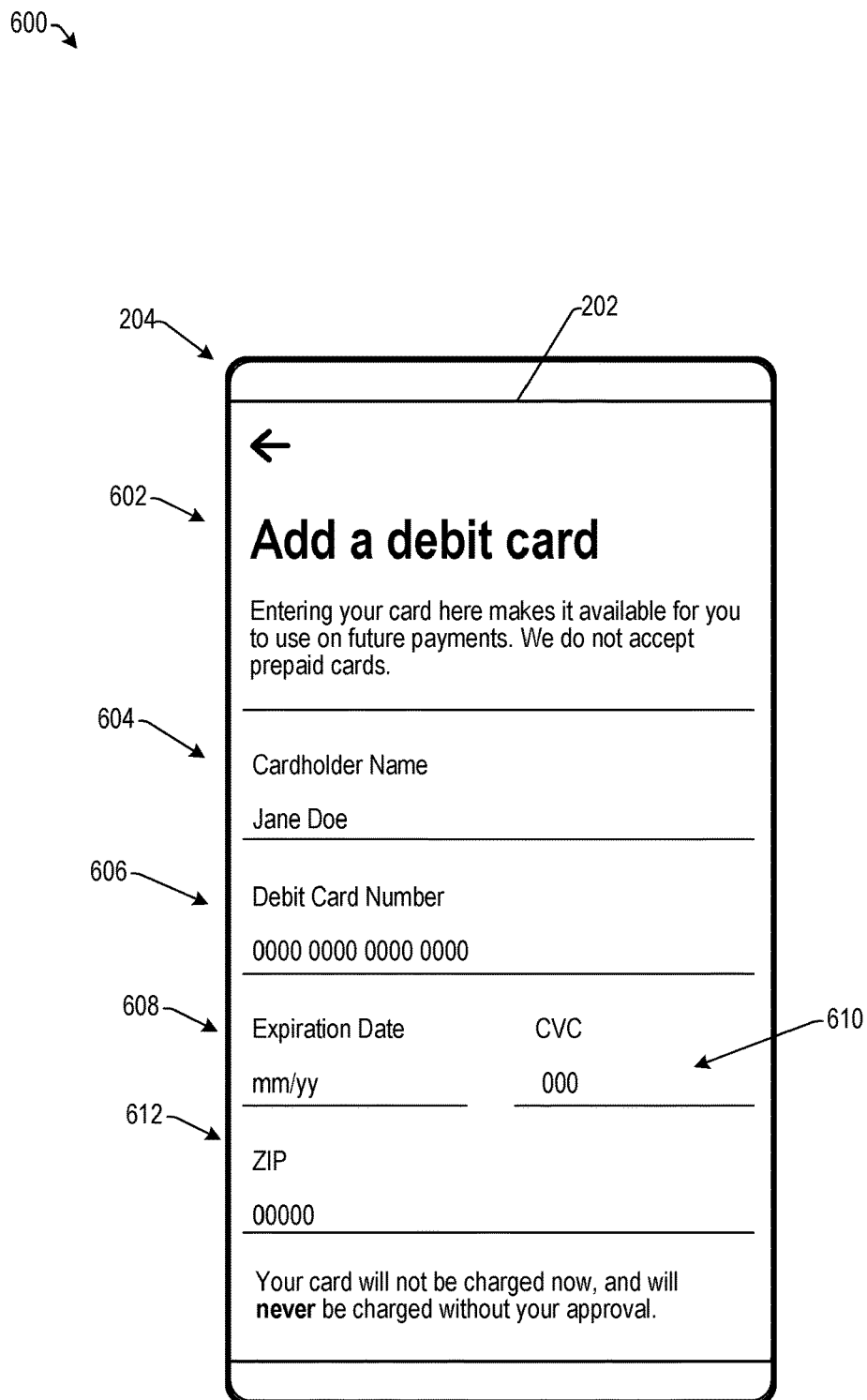
FIG. 6 illustrates an example financing UI portion that may be presented on the display according to some implementations.

FIG. 6 illustrates an example financing UI portion 600 that may be presented on the display 202 according to some implementations. In the example of FIG. 6, financing UI portion 600 may be presented on the display 202 in the situation in which the buyer has determined to select one of the financing repayment options discussed above with respect to FIG. 5. Alternatively, in other examples, the UI portion 600 may be presented before the financing UI portion 500. In either event, the financing UI portion 600 includes a request 602 that the buyer submit debit card information, including the cardholder name 604, the debit card number 606, the debit card expiration date 608, the debit card CVC (card verification code) 610, and the ZIP Code 612 associated with the debit card.

For instance, the ability to provide valid debit card information demonstrates that the buyer has a deposit account, such as a checking account, or other bank account, that is able to serve as a source of funds for repayment of the financing. In some examples, as an alternative to a debit card, the buyer may be permitted to manually enter a checking account routing number. In some cases, if the buyer is unable to provide information for a valid debit card associated with a deposit account (e.g., as opposed to a prepaid debit card), then the request for financing may be denied.

Figure 7:
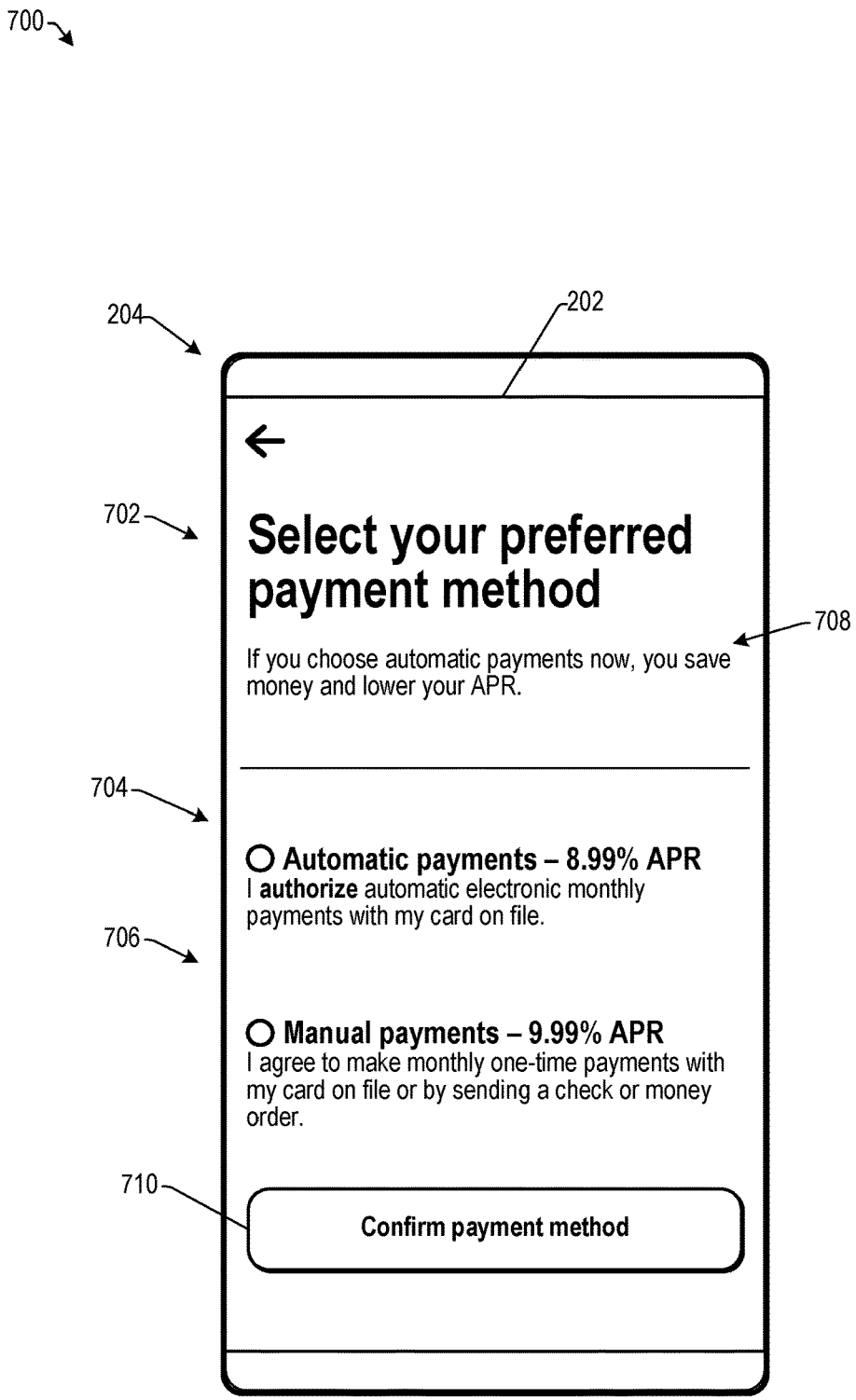
FIG. 7 illustrates an example financing UI portion that may be presented on the display according to some implementations.

FIG. 7 illustrates an example financing UI portion 700 that may be presented on the display 202 according to some implementations. In the example of FIG. 7, financing UI portion 700 may be presented on the display 202 in the situation in which the buyer has provided valid debit card information and has selected one of the options presented for repayment of the financing. In this example, the buyer is provided with the option to select a preferred repayment method as indicated at 702. In particular, the buyer may be able to select automatic payments 704 in which the buyer's debit card is automatically charged for the repayment amount each month until the financing is paid off, or the buyer may be able to select manual payments 706 in which the buyer manually authorizes payment each month. For example, for making manual payments, the buyer may log in to an account with the service provider every month to authorize payment with the debit card, or can mail or otherwise provide a check or money order, or the like, each month as payment.

In addition, as indicated at 708, the financing UI portion 700 may include an incentive for encouraging the buyer to select the automatic payment option 704. For instance, the financing UI portion 700 may offer the buyer a reduced interest rate or other incentive if the buyer selects the automatic payment option 704 instead of the manual payment option 706. Selection of the automatic payment option may lead to more reliable repayment of the financing and may reduce the risk of missed payments by the buyer. In this way, the debit card used to for repayment of the financed amount effectively becomes a financing instrument for enabling a purchase during a transaction at a particular merchant. Following selection of one of the payment options 704 or 706, the buyer may select a "confirm payment method" virtual control 710 to confirm the selected payment method.

Figure 8:
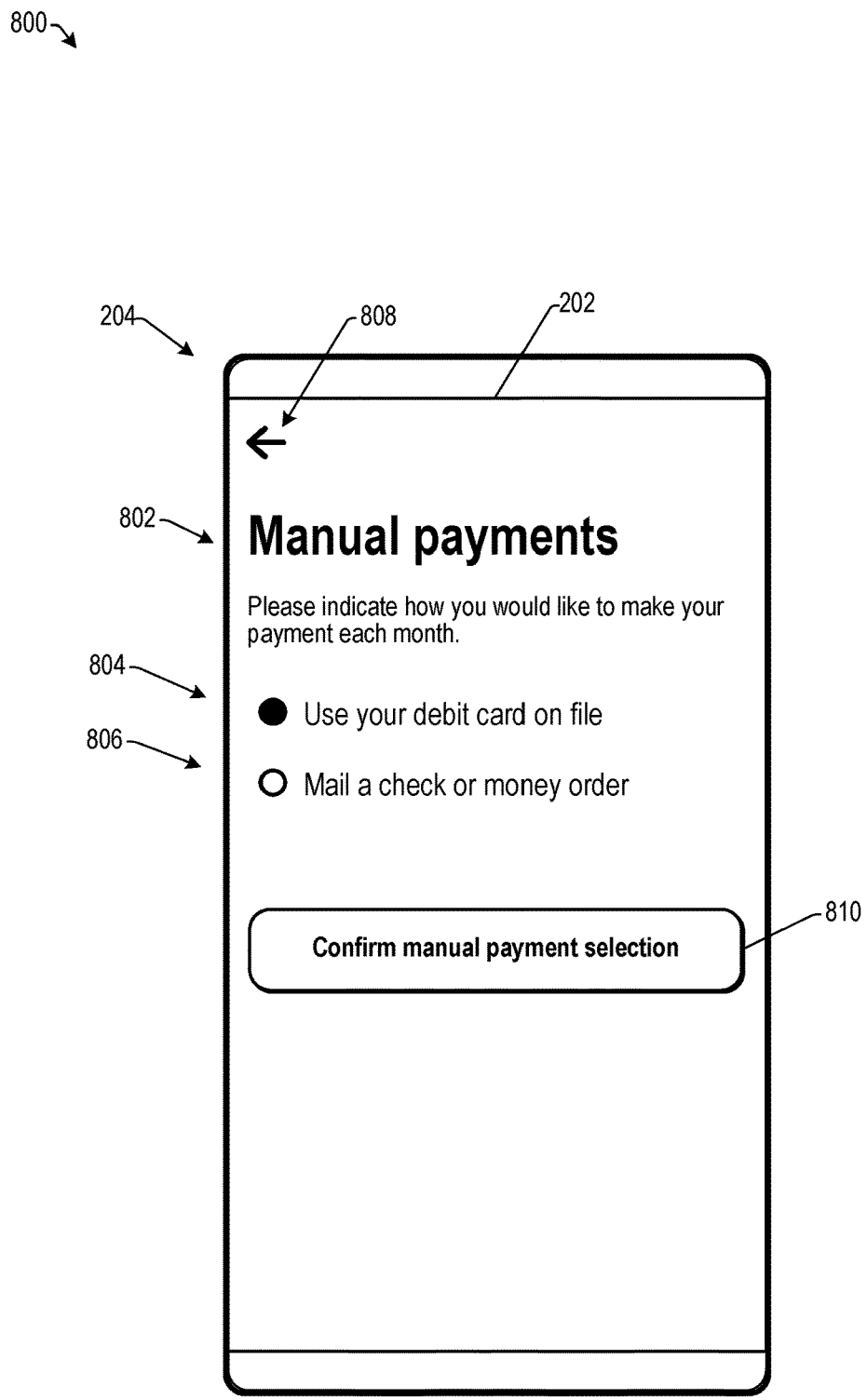
FIG. 8 illustrates an example financing UI portion that may be presented on the display according to some implementations.

FIG. 8 illustrates an example financing UI portion 800 that may be presented on the display 202 according to some implementations. In the example of FIG. 8, financing UI portion 800 may be presented on the display 202 in the situation in which the buyer has selected the manual payment option discussed above with respect to FIG. 7. The financing UI portion 800 may request, as indicated at 802 that the buyer indicate how the buyer would like to make manual payments each month. For instance, the buyer may be presented with a first option 804 for making manual payments by debit card, and a second option 806 for making manual payments by mailing a check or money order. Furthermore, if the buyer changes his or her mind regarding manual payments and would like to return to the previous financing UI portion 700, the buyer may tap on or otherwise select a back arrow 808. When the buyer has selected one of the manual payment options 804 or 806, the buyer may select a "confirm manual payment selection" virtual control 810.

Figure 9:
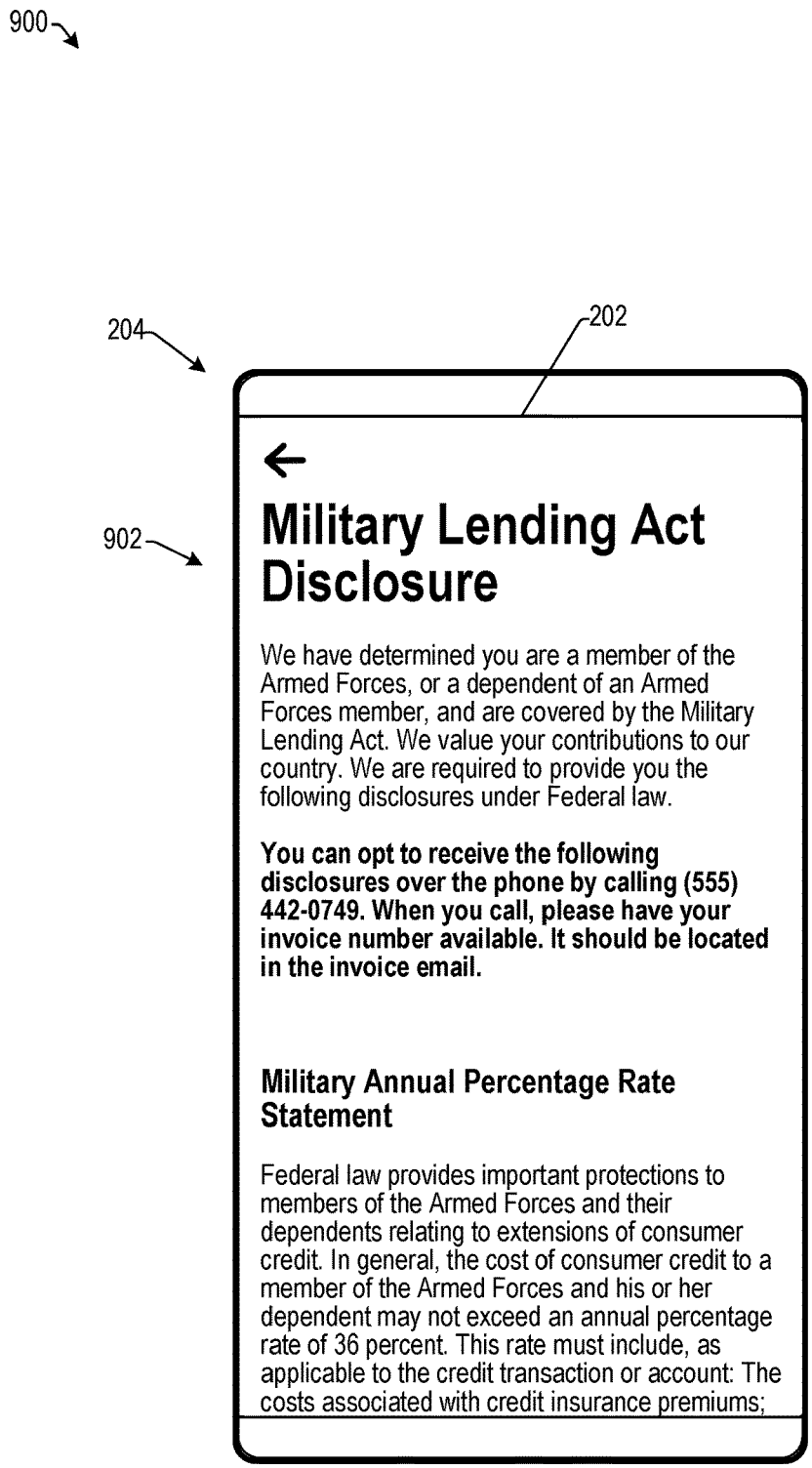
FIG. 9 illustrates an example financing UI portion that may be presented on the display according to some implementations.

FIG. 9 illustrates an example financing UI portion 900 that may be presented on the display 202 according to some implementations. In the example of FIG. 9, financing UI portion 900 may be presented on the display 202 in the situation in which the buyer has been approved for financing and has completed the request successfully. Various types of disclosures and additional information may be presented to the buyer depending on the location and jurisdiction in which the financing is taking place. For example, the service provider may determine from the information provided by the buyer and/or the information in the buyer's buyer profile that the buyer is a member of the Armed Forces or a dependent of an Armed Forces member and therefore is covered by the military lending act. Accordingly, the example financing UI portion 900 may include a required disclosure under the Military Lending Act, as indicated at 902. Additionally, or alternatively, the required disclosures may also be sent to the email address provided by the buyer during application for the financing.

Figure 10:
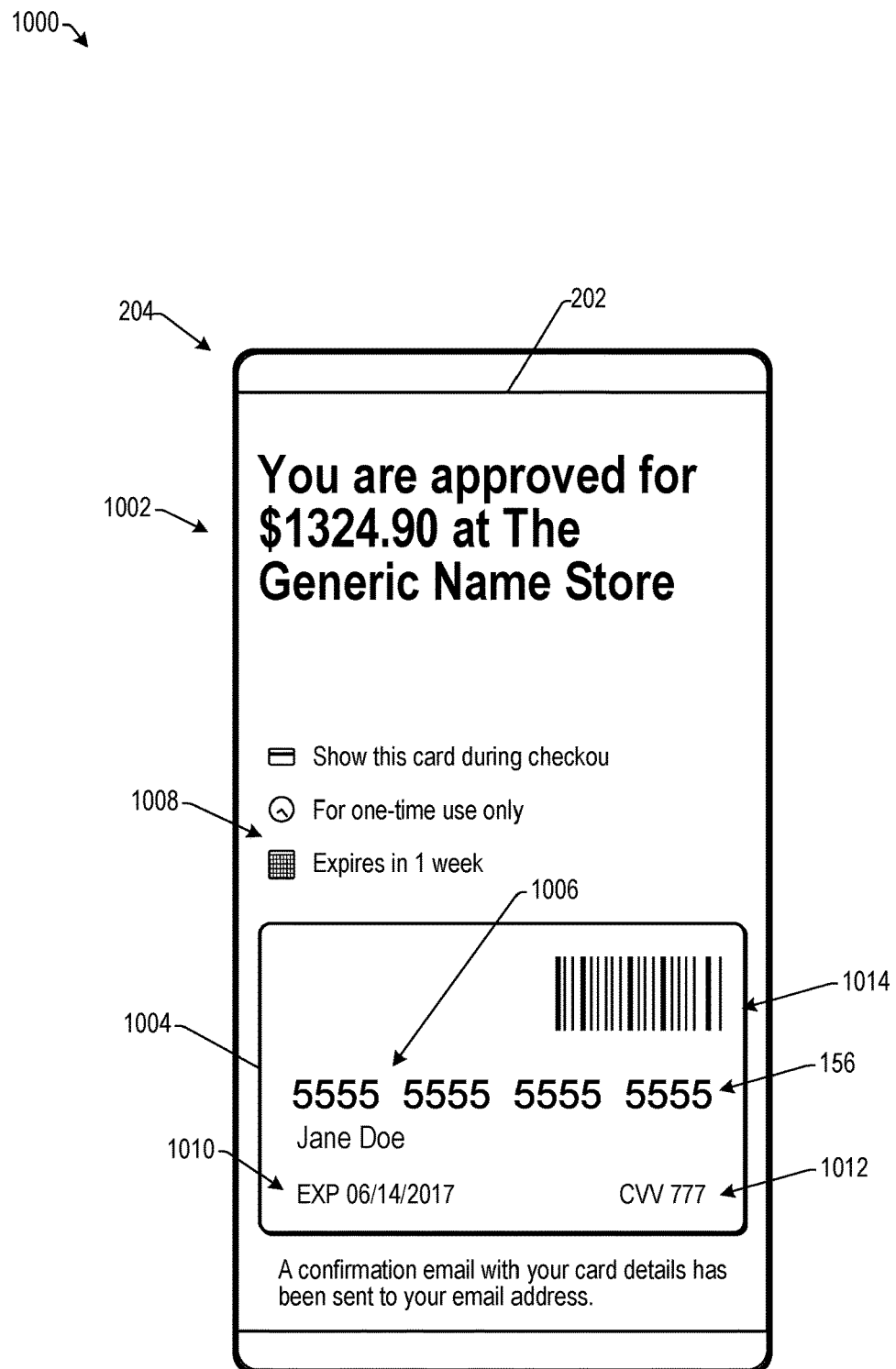
FIG. 10 illustrates an example financing UI portion that may be presented on the display according to some implementations.

FIG. 10 illustrates an example financing UI portion 1000 that may be presented on the display 202 according to some implementations. In the example of FIG. 10, financing UI portion 1000 may be presented on the display 202 in the situation in which the buyer has completed the application for financing and been approved. The financing UI portion 1000 may include an indication 1002 that the buyer has been approved for the requested amount of financing at the specified merchant. In addition, the financing UI portion 1000 may present a virtual payment card 1004 that includes a virtual account number such as the financing payment code 156, as discussed above, e.g., with respect to FIG. 1.

In some examples, the financing payment code 156 may be a 16-character string that represents the agreement for the financing provided to the buyer for making a purchase from the specified merchant. Further, the first six characters 1006 of the financing payment code 156 may serve as an indicator that the financing payment code 156 is a financing code and not a regular credit card number, or the like. For example, the merchant application on a merchant POS device may be configured to recognize the financing payment code 156 as a financing code, and may be configured to process the transaction as a financed transaction rather than as a cash or payment card transaction. In one example, the financing payment code 156 is associated with the particular merchant and the one or more items to be purchased from the merchant. That is, if the transaction information at the POS terminal includes a different item than what the buyer previously selected for financing, the according to one example, the financing payment code 156 will not work for that transaction. Alternatively, in other examples, the financing payment code 156 may be used for a transaction at the specified merchant, whether for the selected item or a different item, upon a determination the total transaction amount is less than the approved financed amount.

In addition, the financing and/or the financing payment code 156 may have an associated expiration time limit. For instance, in this example, as indicated at 1008, the financing UI portion 1000 may inform the buyer that the financing payment code 156 expires in one week and/or the virtual payment card may include an expiration date corresponding to the one week time limit as indicated at 1010. Additionally, in some examples, the virtual payment card 1004 may include a card security code 1012 such as a card verification value (CVV), card verification code (CVC), or the like. For example, the card security code 1012 may be requested by the merchant as an additional verification against fraudulent use of the financing payment code 156. In addition, in some cases, the virtual payment card 1004 may include a barcode or other machine-readable indicia 1014 that may be scanned by a barcode reader at a merchant device to quickly and accurately read the financing payment code 156.

In some examples, the buyer may present the virtual payment card 1004 at the POS terminal, and the merchant may key in, scan, or otherwise utilize the financing payment code for receiving payment for the purchase made by the buyer. In some examples, the financing payment code may be for one-time use only, and may be used only at the approved merchant named in the financing UI portion 1000. Additionally, in some examples, the buyer may be limited to purchasing an item specified when the financing was applied for and/or a similar item, e.g., in the same item category. In other examples, the financing may be used for purchasing any one or more items at the specified merchant and is not limited to being used for the purchase of any particular item.

Figure 11:
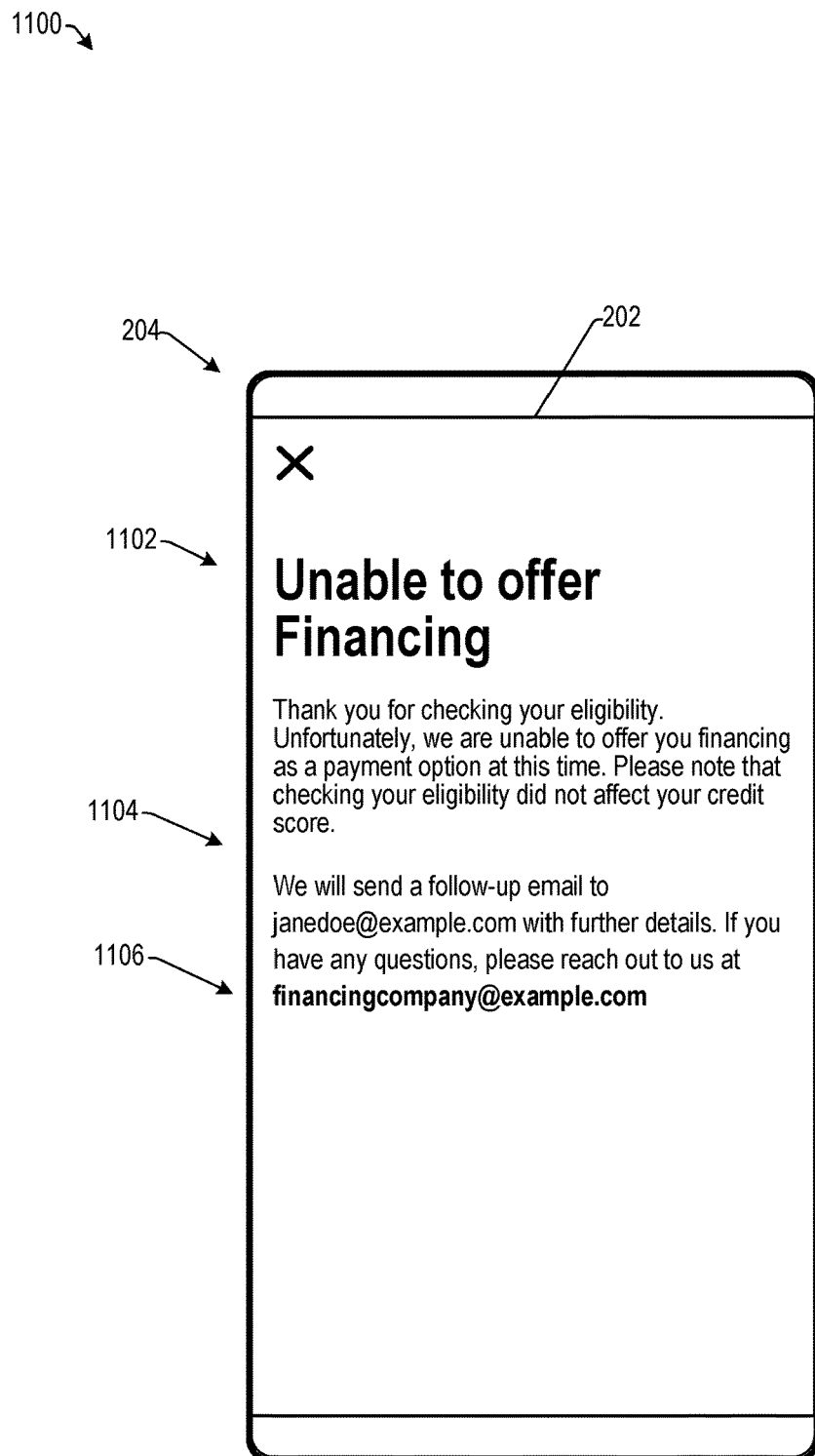
FIG. 11 illustrates an example financing UI portion that may be presented on the display according to some implementations.

FIG. 11 illustrates an example financing UI portion 1100 that may be presented on the display 202 according to some implementations. In the example of FIG. 11, financing UI portion 1100 may be presented on the display 202 in the situation in which the buyer is refused financing. For example, the financing UI portion 1100 may inform the buyer that the buyer is not eligible for financing as indicated at 1102. In addition, as indicated at 1104, the financing UI portion 1100 may inform the buyer that a follow-up email with full details will be sent to the buyer at the email address provided by the buyer. Furthermore, as indicated at 1106, the buyer may be provided with contact information for contacting the service provider if the buyer has any additional questions.

Figure 12:
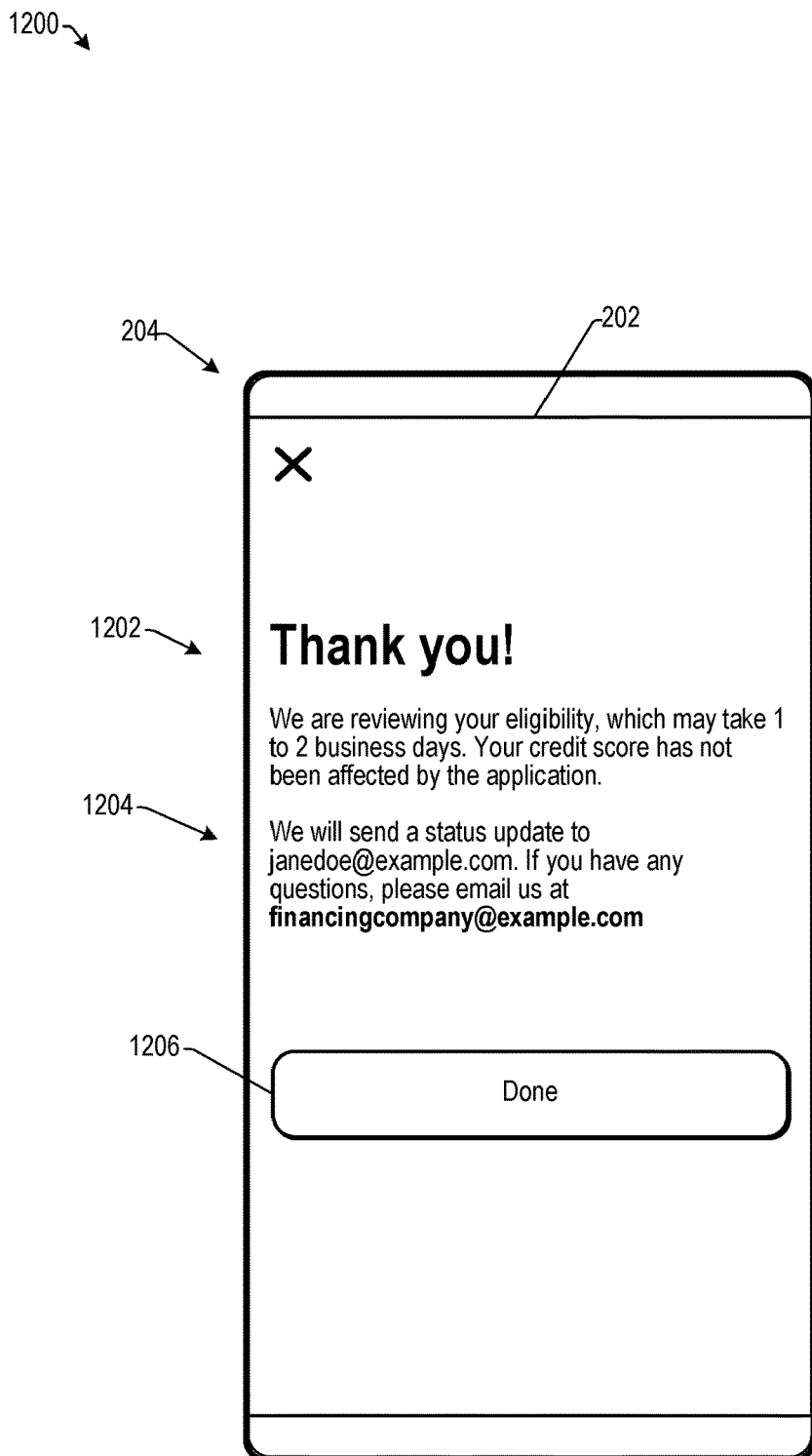
FIG. 12 illustrates an example financing UI portion that may be presented on the display according to some implementations.

FIG. 12 illustrates an example financing UI portion 1200 that may be presented on the display 202 according to some implementations. In the example of FIG. 12, financing UI portion 1200 may be presented on the display 202 in the situation in which a manual review is to be performed of the buyer's request for financing. For instance, as indicated at 1202, the buyer may be informed that the buyer's eligibility for financing will be reviewed within 1 to 2 business days. Furthermore, as indicated at 1204, the financing UI portion may inform the buyer that a status update regarding the request for financing will be sent to the email address provided by the buyer and/or that the buyer may contact an email address of the service provider if there are any additional questions. The financing UI portion 1200 may further include a "done" virtual control 1206, which may be selected by the buyer to end the interaction with the financing UI.

Figure 13:
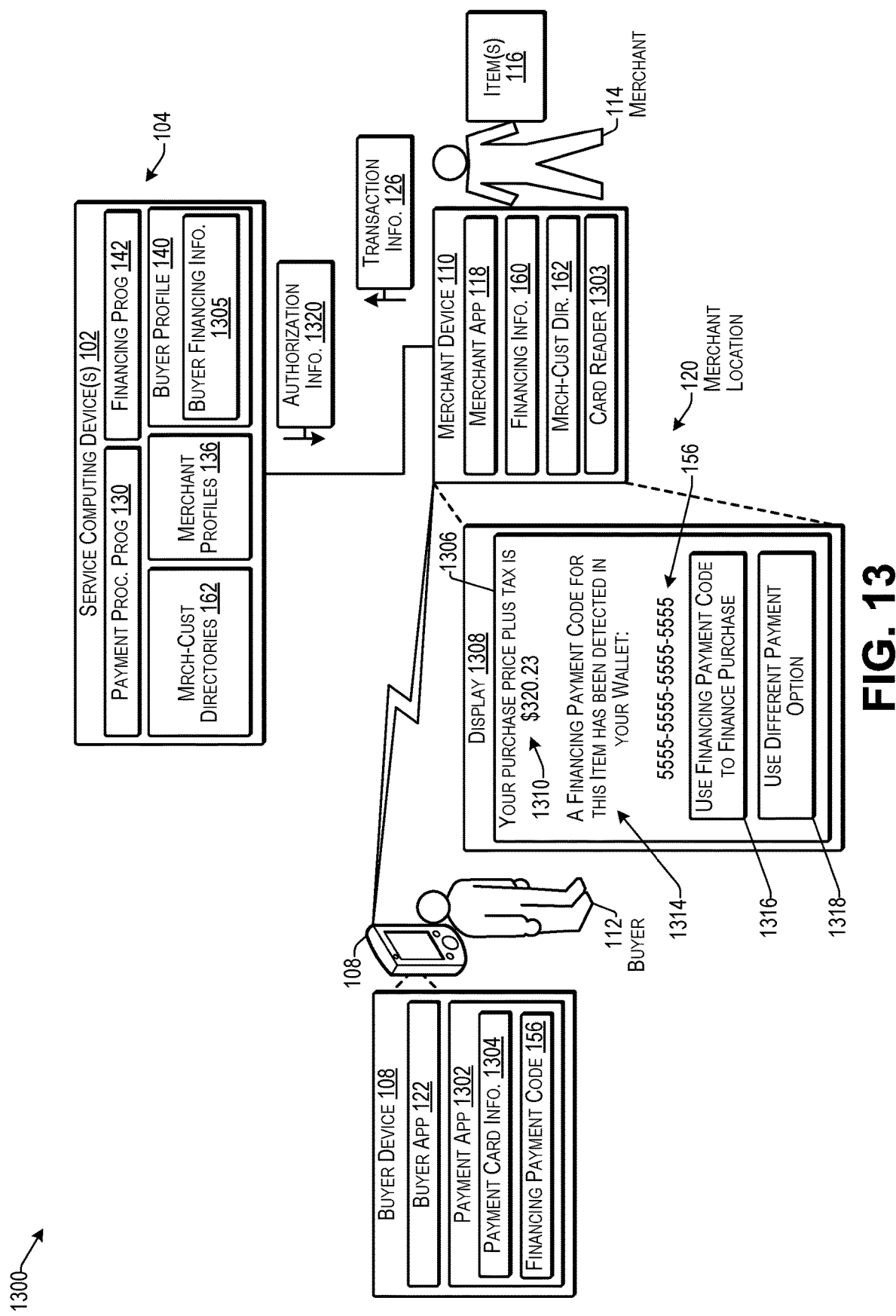
FIG. 13 illustrates an example system architecture for performing a transaction with financing according to some implementations.

FIG. 13 illustrates an example system architecture 1300 for performing a transaction with financing according to some implementations. In this example, suppose that the buyer 112 has already obtained the financing for purchasing an item 116 from the specified merchant 114, e.g., as discussed above with respect to FIGS. 1-12. The buyer 112 may present the virtual card and/or the financing payment code 156 to the specified merchant 114 at the merchant device 110 to purchase one or more items 116. In some cases, the buyer may purchase only the item specified in the financing request, while in other examples, the buyer may purchase any items offered by the specified merchant 114 at a total price less than or equal to the approved amount of the financing.

Additionally, if the buyer attempts to purchase an item for more than the approved financed amount, in some examples, the financing program 142 may determine in real time, i.e., while the buyer 112 is conducting the transaction, that the buyer 112 is eligible to receive financing for the additional amount. Alternatively, if the buyer 112 is not eligible for the additional amount, the merchant application 118 may receive an indication of such from the financing program 142 via the payment processing program 130. Receipt of this information may cause the merchant application 118 to present a request to buyer 112 to pay the difference using a different payment instrument.

In some examples, the merchant 114 may key in the financing payment code 156, such as using a keyboard, keypad, or the like (not shown in FIG. 13), associated with the merchant device 110. In other examples, a barcode or other machine-readable indicia may be included with the virtual card, which may be scanned using a barcode reader, or the like (not shown in FIG. 13).

In some implementations, the buyer device 108 may include a wallet application, contactless payment application, or the like, such as APPLE PAY®, GOOGLE wallet, or other payment application 1302 that retains or is otherwise able to access the financing payment code 156 provided to the buyer 112 for the financing. As one example, the payment application 1302 and/or the buyer application 122 may communicate directly, e.g., wirelessly, with a card reader 1303, or the like, including wireless capability and connected to the merchant device 110. For example, the merchant device 110 may be configured by the merchant application 118 to act as a POS terminal of the merchant 114 during the purchase transaction, and the merchant application 118 may communicate wirelessly with the buyer device 108 for receiving an electronic payment.

As mentioned above, in some cases, the financing payment code 156 may be a 16 character string that represents the agreement for the service provider to provide the financing to the buyer 112 for making a purchase from the merchant 114. Further, a portion of the financing payment code 156, such as the first four, five, six, seven characters, etc., may serve as an indicator that the financing payment code 156 is a financing code and not a regular credit card number, or the like. Thus, the merchant application 118 on the merchant device 110 may be able to recognize the financing payment code 156 as a financing code, and may determine whether the payment code matches a financing payment code that the merchant device 110 received from the service computing device 102.

The merchant application 118 may automatically detect the financing payment code 156 for the financing, and may use the financing payment code 156 for obtaining payment for one or more items 116 being purchased by the buyer 112. For instance, the merchant application 118 may be configured to use the card reader 1303 to read payment card information 1304 maintained by the payment application 1302, and may also read the financing payment code 156. Based, e.g., on the first six digits of the financing payment code 156, the merchant application 118 is able to recognize the financing payment code 156 as a financing code provided by the service provider 104, and distinguish the financing payment code 156 from one or more other payment card codes included in the payment card information 1304 that would normally be used when receiving payment from the payment application 1302.

As one example, the merchant device 110 may have previously received the financing payment code 156 from the service computing device 102, such as with the financing information 160 received by the merchant device 110 after the financing was approved by the service computing device 102. For example, upon approval of the financing to the buyer 112, the financing program 142 may send the financing information 160 to the merchant application 118 on the merchant device 110. The financing information 160 may include the financing payment code 156, as well as other identifying information about the buyer 112, such as name and/or verification credentials, such as password, biometric information, a security code associated with the financing payment code 156, phone number, ZIP code, or the like. The merchant application 118 may match the detected financing payment code 156 on the buyer device 108 with the financing payment code 156 received with the financing information 160 from the service computing device 102. Based on the matching the financing payment codes 156, the merchant application 118 may determine that the financing payment code 156 detected on the buyer device 108 is intended to be applied for purchases made from the current merchant 114.

Additionally, or alternatively, the financing payment code 156 may be included in a merchant-customer directory 162 received by the merchant device 110 from the service computing device 102 after the financing was approved by the service computing device 102. The merchant application 118 may search the merchant-customer directory 162 for a matching financing payment code 156 when the financing payment code 156 is detected on the buyer device 108.

As another alternative, the merchant application 118 on the merchant device 110 may recognize a portion (e.g., the first six digits) of the financing payment code 156 on the buyer device as indicating that the code is a financing payment code 156 for financing from the payment processing system. Based on this, the merchant application 118 may send the financing payment code 156 to the service computing device 102 to determine whether the financing payment code 156 is for making a purchase from the current merchant 114.

Upon receipt of the financing payment code 156 from the merchant application 118, the financing program 142 may associate the received financing payment code 156 with buyer financing information 1305 associated with a particular the buyer profile 140 and may determine therefrom the merchant for which the financing is approved, the amount of financing approved for making a purchase from the merchant, as well as other identifying information about the buyer that the merchant 114 may use to verify the identity of the buyer 112. In response, the service computing device 102 may provide the financing information 160, including the financing payment code 156, an authorized purchase amount, and buyer information, to the merchant application 118 to enable the merchant application 118 to proceed with the transaction as a financed transaction based on the received payment code 156.

After the merchant application 118 determines that the financing payment code 156 may be used for the current transaction for one or more of the items 116, the merchant application 118 may present a transaction UI 1306 on a display 1308 associated with the merchant device 110. For example, the transaction UI 1306 may include information about the transaction such as the total purchase price plus tax 1310, and an indication 1314 that the financing payment code has been detected in the buyer's payment application 1302. The transaction UI 1306 may further include a first virtual control 1316 that may be tapped on or otherwise selected by the buyer 112 to authorize use of the financing payment code 156 to finance payment for the current transaction. The transaction UI 1306 may further include a second virtual control 1318 that may be tapped on or otherwise selected by the buyer 112 to select a different payment option for paying for the current transaction.

In this example, suppose that the buyer selects, via the transaction UI 1306, the first virtual control 1316 to use the financing payment code 156 as payment for the current transaction. In response, the merchant application 118 may send transaction information 126 to the service computing device 102, which may be processed by the payment processing program 130. For example, the payment processing program 130 may receive the financing payment code 156 from the merchant device 110, and may refer to the financing program 146 to receive authorization for crediting the account of the merchant 114 for the amount of the purchase price of the purchased item(s) 116. Based on received authorization from the financing program 142, the payment processing program 130 may send authorization information 1320 to authorize the merchant application 118 to complete the transaction.

In some examples, following completion of the transaction, the financing payment code 156 may no longer be valid and may be deleted from the payment application 1302 by the buyer 112, the payment application 1302, the buyer application 122, or the like. Alternatively, in other examples, if there is a remaining balance of unused financing, the same financing payment code 156 may be used for a subsequent transaction for less than or equal to the remaining amount. As another alternative, following completion of the transaction, a new financing payment code may be issued for the remaining balance of the financed amount. Furthermore, the buyer financing information 1305 in the buyer profile 140 may be updated to indicate the amount spent and when the first payment by the buyer for repayment of the financing is due. A communication may be sent to the buyer 112 to indicate the first payment due date and amount.

As another example, the buyer may be offered financing automatically during checkout at eligible merchants. For example, suppose that the buyer 112 was previously approved for financing at the current merchant 114 or at a different merchant, but never used the approved financing and the financing payment code 156 expired. Furthermore, suppose the buyer 112 is making a purchase at the current merchant 114, who uses the payment processing service, and that the current merchant 114 has been determined by the financing program 142 to be an eligible merchant for which buyers are able to obtain financing.

Suppose that the buyer 112 offers a payment instrument, such as a payment card, for payment of the purchase. The payment processing program 130 may recognize the buyer 112 based on the payment card information. For example, the payment card may be the debit card that the buyer 112 previously used when applying for the financing. Alternatively, the payment card may be a different payment card, such as a credit card that the buyer has previously used, and that has been associated with the buyer profile 140 maintained by the payment processing program 130 for the buyer 112. Upon recognizing the buyer, the payment processing program 130 may determine from the financing program 142 that the buyer previously completed a request for financing, was approved, but did not use the financing. Accordingly, the financing program 142 may determine that the buyer 112 is still eligible for financing, and may determine that the total current transaction amount is within an approved amount for the buyer 112. For example, the financing program 142 may run a new analysis of the buyer 112 in real time using a machine learning model, or the like, to determine that the buyer is still eligible for at least the amount of the purchase. Further, in some examples, the financing program 142 may determine that the transaction is eligible for financing, such as by checking that the transaction amount is above a minimum threshold amount that would make it worthwhile to finance the transaction, is below an maximum threshold amount for financing, and is for an item for which financing is available.

Based on these determinations, the payment processing program may cause the merchant application 118 to present to the buyer e.g., on the buyer facing display 1308, an offer for financing for the amount of the current transaction, along with terms for the financing customized based on the analysis of the buyer 112 and the current merchant 114. If the buyer 112 accepts the financing offer, the buyer 112 may be asked whether the buyer would like to apply the previously selected repayment terms or to select new repayment terms, such as a number of payments and whether the buyer 112 would like manual or automatic payments. Following these selections, the buyer 112 may complete the transaction entirely through the offered financing.

Figure 14:
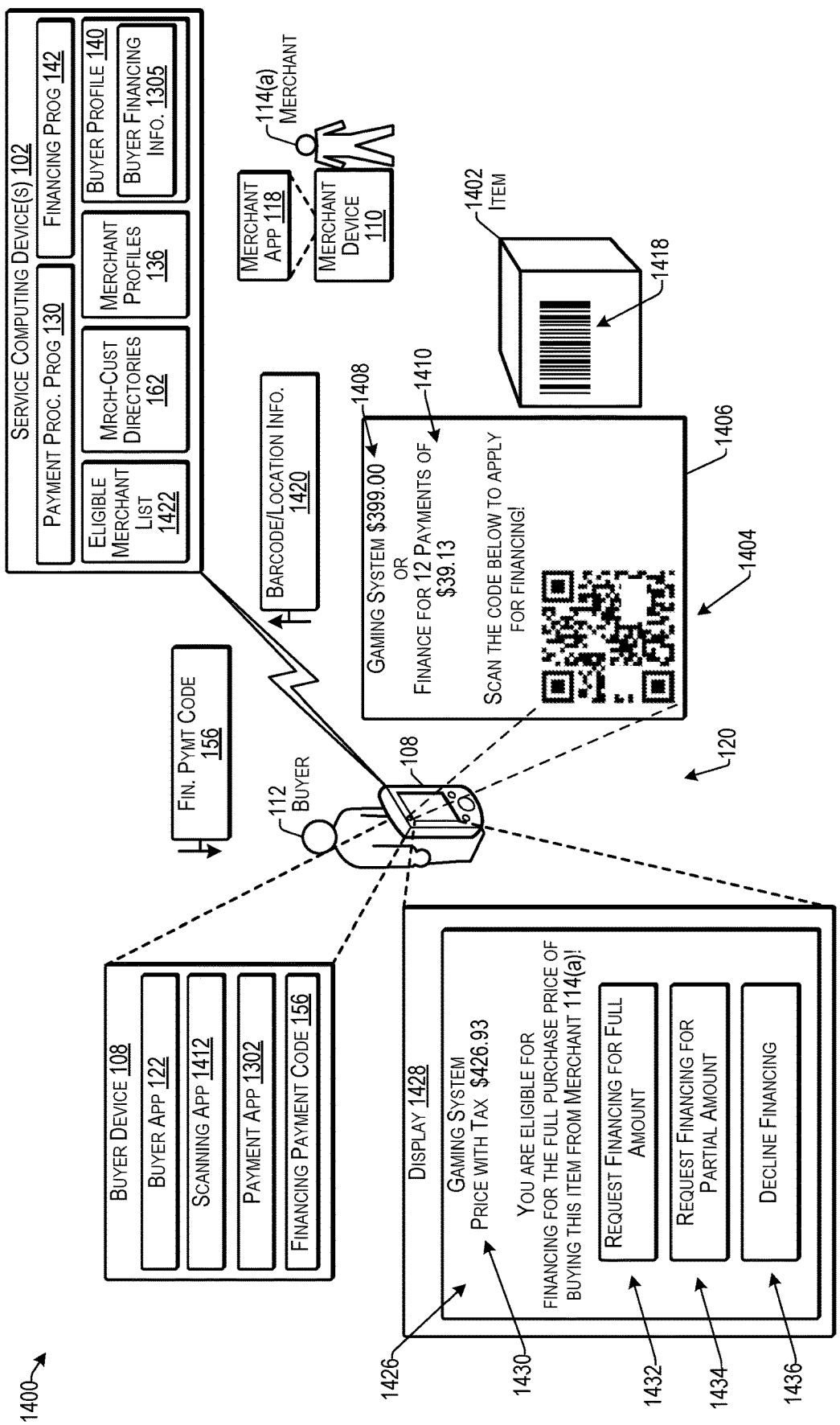
FIG. 14 illustrates an example system architecture for determining financing according to some implementations.

FIG. 14 illustrates an example system architecture 1400 for determining financing according to some implementations. In this example, suppose that the buyer 112 is at the merchant location 120 of a merchant 114(a), and the buyer 112 is interested in buying an item 1402, such as a gaming system. In this example, suppose that the merchant 114(a) has included machine-readable indicia 1404, such as a matrix barcode, two-dimensional barcode, Quick Response code, or the like, on the pricing label, signage, advertising, or other printed information 1406 for the gaming system. The printed information 1406 may further include the cash or credit card price 1408 for the gaming system, as well as an invitation to finance the gaming system for a number of payments, as indicated at 1410.

Upon scanning the machine-readable indicia 1404, the buyer's device may be directed to a URL, or the like, to present the financing UI portion 200 discussed above with respect to FIG. 2, to enable the buyer 112 to apply for financing for the gaming system. For example, the buyer application 122 (e.g., a browser in some examples) or a dedicated barcode scanning application 1412 on the buyer device 108 may be directed to a URL that provides the financing UI. Upon receiving the financing UI presented on the buyer device 112, the buyer 112 may proceed with requesting financing to purchase the gaming system item 1402 from the merchant 114(a) without interacting with the merchant 114(a) until after the financing is approved.

The buyer 112 may progress through the financing UI discussed above with respect to FIGS. 2-12, and may receive an financing payment code 156 from the service computing device 102. Upon receipt of the financing payment code 156, the buyer may proceed to the POS location of the merchant 114(a), and may proceed with purchasing of the gaming system 1402, e.g., using any of the techniques discussed above with respect to FIG. 13, or other techniques as will be apparent to those of skill in the art having the benefit of the disclosure herein.

In addition, as an alternative example, suppose that the buyer 112 has already completed an application for financing, and received financing for a purchase at either the merchant 114(a), or a different merchant (not shown in FIG. 14) in the distributed system. In some examples, the buyer may be automatically offered additional financing for making purchases at the merchant 114(a) or other merchants participating in the distributed system. In some cases, the financing program 142 may determine that the buyer 112 is at a place of business or other POS location of a particular merchant, such as the merchant 114(a), and may immediately pre-underwrite the buyer for common and/or selected purchases at that merchant. Thus, in some cases, the buyer 112 may be pre-approved for financing items commonly purchased from the merchant 114(a) as soon as the financing program detects that the buyer is in the merchant's store. For example, the buyer application 112 may communicate with the financing program 142 or the merchant application 118 when the buyer device 108 is within a threshold distance of a merchant device 110.

As another example, suppose that the buyer 112 is shopping at the merchant location 120 of the merchant 114(a), and uses the buyer application 122, the scanning application 1412 on the buyer device 108, or other application, to scan a barcode 1418 of the gaming system item 1402 at the merchant location 120. For instance, in this example, the buyer application 122 may be a proprietary application that may send the barcode information and GPS (Global Positioning System) coordinates 1420 or other location information of the buyer device 108 to the financing program 142 at the service computing device 102, thus providing an indication of the item 1402 and the buyer location.

In response, the financing program 142 on the service computing device 102 may identify the merchant location 120 based on the GPS location of the buyer 112. For example, the financing program 142 may access the merchant profiles 136 of the merchants in the distributed system to determine a match for the GPS location received from the buyer device 108. If there is no match, then the merchant might not be participating in the service provider's payment processing system, and financing may be unavailable. On the other hand, if the merchant does participate in the payment processing system, and there is a match, the financing program 142 may determine whether the merchant 114(*a*) is one for which financing is available for its customers. For instance, the financing program 142 may maintain an eligible merchant list 1422 of merchants for which buyers are able to obtain financing. In some cases, the eligible merchant list 1422 may have been generated in advance using one or more merchant-eligibility machine learning models, as discussed elsewhere herein. As an alternative, rather than relying on a pre-generated eligible merchant list 1422, the financing program 142 may enter the merchant profile information 136 for the merchant 114(*a*) into a merchant-eligibility machine learning model to determine if the financing program should offer financing to customers of the merchant 114(*a*).

In addition, based on identifying the merchant 114(*a*), and based on the received barcode information, the financing program 142 may determine the merchant's price for the item 1402 and sales tax from the merchant profile 136 for the merchant 114(*a*). For example, when the merchant 114(*a*) joined the payment processing system, the merchant 114(*a*) may have uploaded the pricing information, UPC numbers, and item descriptions of all items offered by the merchant 114(*a*), and may periodically update this information to keep it up to date.

The payment processing program 130 may have stored this information in the merchant profile 136 for the particular merchant 114(*a*), and the financing program 142 may access the merchant information data structure to determine the price of the item 1402 based on the received barcode information (e.g., by determining and matching the UPC number for the item).

Accordingly, based on determining that financing is available for purchases at the merchant 114(*a*), and based on determining the purchase price for the item, the financing program 142 may determine in real time that the buyer qualifies for financing for the scanned item based on the techniques discussed above without the buyer 112 having to complete another financing application.

The financing program 142 may send information to the buyer device 108 to cause the buyer application 122 or other application on the buyer device 108 to present financing information UI 1426 on a display 1428 associated with the buyer device 108. For example, the financing information UI 1426 may include the price with tax 1430 of the scanned item and an indication of an offer for financing the purchase of the item from the merchant. Further, the financing information UI 122 may include virtual controls for accepting or rejecting the financing. The buyer may select a first virtual control 1432 for receiving financing for the full amount of the purchase price; the buyer may select a second virtual control 1434 for requesting financing for a partial amount of the purchase price; or the buyer may select a third virtual control 1436 to decline the financing.

Additionally, or alternatively, rather than scanning a barcode, the buyer may use any other technique for identifying an item and merchant location, such as sending a photo of the item, sending a manually entered UPC number, or the like. As still another alternative, if the item has an associated two dimensional barcode 1404, the buyer may merely scan that barcode 1404 to receive an immediate offer of financing in the financing information UI 1426 without having to start the financing application process over. Furthermore, in some cases, before financing is granted, the financing program 142 may perform a check of the identity of the person using the buyer device 108 to minimize the chance of fraud and engender customer trust, such as by requiring a password from the buyer 112, receiving biometric information from the buyer 112, or the like.

Figure 15:
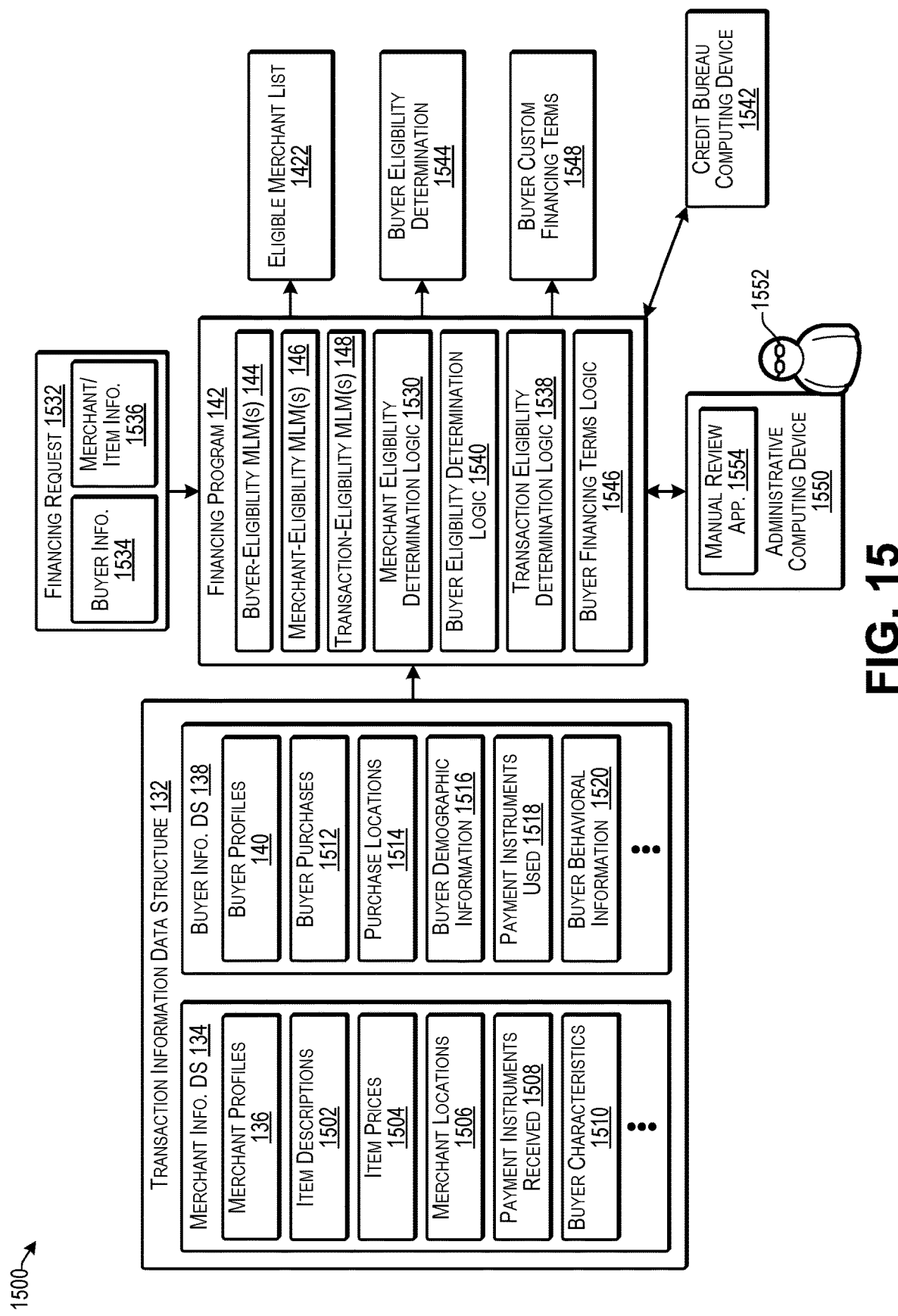
FIG. 15 illustrates an example framework for determining merchant eligibility, buyer eligibility, and custom financing terms according to some implementations.

FIG. 15 illustrates an example framework 1500 for determining merchant eligibility, buyer eligibility, and custom financing terms according to some implementations. In some examples, the financing program 142 may apply one or more merchant-eligibility machine learning models 146 when determining merchants 114 at which the service provider 104 is willing to offer financing to buyers. Further, the financing program 142 may apply one or more transaction-eligibility machine learning models 148 when determining whether financing is available for a particular transaction. In addition, the financing program 142 may apply one or more buyer-eligibility machine learning models 144 when determining buyer eligibility and terms for financing.

In the example of FIG. 15, the financing program 142 may access the transaction information data structure 132 to obtain transaction information for determining which merchants to make eligible for having their buyers being able to obtain financing for making purchases from the respective merchant. As mentioned above, the transaction information data structure 132 may include the merchant information data structure 134 and the buyer information data structure 138. The merchant information data structure 134 may include merchant profiles 136, item descriptions 1502 associated with transactions, item prices 1504, merchant locations 1506, payment instruments received 1508, buyer characteristics 1510, and so forth. In addition, the buyer information data structure 138 may include the buyer profiles 140, buyer purchases 1512 associated with transactions, purchase locations 1514, demographic information 1516, payment instruments used 1518, buyer behavioral information 1520, and so forth. Furthermore, while several types of information included in the transaction information data structure 132 are illustrated in FIG. 15, numerous other types of information are included in the transaction information data structure 132, and are available for use by the financing program 142 during analysis of the transaction information, as described elsewhere herein, and/or as will be apparent to those of skill in the art having the benefit of the disclosure herein.

For determining which of the merchants to make eligible for having their buyers received financing, the financing program 142 may determine which merchants sell high-ticket items that are conducive to being financed, which merchants have customers with good credit histories, which merchants have a low return/refund/charge-back rate, and the like. The financing program 142 may build one or more merchant-eligibility machine learning models (MLMs) 146 that determine the eligible merchants based on these and/or other attributes indicative of having customers who are more likely than average to repay a loan. Furthermore, the merchant-eligibility MLM(s) 146 may also be trained to determine items offered by the merchants that are good candidates for offering financing, such as based on the price of the item, the return rate of the item, as compared with other items in the transaction information, and so forth. Accordingly, in some examples, the financing program 142 may take into consideration the item for which financing is requested.

In some examples, the merchant-eligibility MLM(s) 146 may take into account some or all payments on prior transactions conducted by a particular merchant that uses the payment processing system. As one example, the merchant-eligibility MLM(s) 146 may take into consideration (e.g., include as a model feature) the credit cards used for each transaction conducted with a particular merchant and the bank associated with the particular credit card. Further, using this information the merchant-eligibility MLM(s) 146 may determine at least generally the credit ratings the customers of certain banks and the credit ratings required to obtain certain credit cards at those banks. Based on this information and other information included in the merchant information data structure 134 and the buyer information data structure 138, the credit scores of the customers of individual merchants can be estimated or otherwise statistically modeled. For example, if a large percentage of customers of an individual merchant are using premium credit cards that require a higher credit score to obtain, then the customers of that merchant may be more likely to repay a loan than the customers of another merchant for whom a large percentage of transactions are conducted using, e.g., prepaid payment cards or checks, which are associated with a higher likelihood of fraud or non-payment.

Examples of machine learning models for selecting merchants to participate in the financing may encompass any of a variety of types of machine learning models, including classification models such as random forest and decision trees, regression models, such as linear regression models, predictive models, support vector machines, stochastic models, such as Markov models and hidden Markov models, deep learning networks, artificial neural networks, such as recurrent neural networks, and so forth. Accordingly, the merchant-eligibility MLMs 146 herein are not limited to a particular type of machine learning model. The transaction information may be divided into a plurality of data sets, some of which may be used for training the merchant-eligibility MLM(s) 146, and others of which may be used for validation and testing of the merchant-eligibility MLM(s) 146.

When the merchant-eligibility MLM 146 has been determined to converge and has been tested successfully, merchant eligibility determination logic 1530 in the financing program 142 may determine which merchants of the plurality of merchants are eligible to have their buyers receive financing. For example, merchant eligibility determination logic 1530 may include operations for inputting the received transaction information associated with individual merchants (e.g., as determined from the merchant profiles 136) into the merchant-eligibility MLM(s) 146. Based on the output of the merchant-eligibility MLM(s) 146, the merchant eligibility determination logic 1530 may classify the individual merchant as eligible or ineligible. Accordingly, a first set of the merchants may be determined to be eligible and a second (or remaining) set of the merchants are ineligible for having their buyers receive financing. Further, the merchant eligibility determination logic 1530 may generate a list of eligible merchants as the eligible merchant list 1422 discussed above, e.g., with respect to FIG. 14 and may store the list.

When a financing request 1532 is received from a buyer (not shown in FIG. 15), the merchant eligibility determination logic 1530 may refer to the eligible merchant list 1422 to determine if the buyer is requesting financing for a purchase from a merchant who is eligible or ineligible. If the merchant is not included in the eligible list 1422, the buyer may be informed that financing is not available for the specified merchant. Alternatively, in some examples, prior to informing the buyer that financing is not available for the specified merchant, the merchant eligibility determination logic 1530 may perform an updated analysis of the specified merchant by including the most recently received transaction information (e.g., received from the specified merchant since the last time specified merchant was excluded from the eligible merchant list 1422) with the transaction information inputted into the merchant-eligibility MLM(s) 146 for the specified merchant to determine if the specified merchant has become eligible since the eligible merchant list 1422 was last compiled. If the merchant's status has changed to being eligible, the eligible merchant list 1422 may be updated by the merchant eligibility determination logic 1530 and the buyer may be permitted to proceed with requesting financing for a purchase from the specified merchant.

As discussed above, the financing request 1532 may include buyer information 1534 and merchant/item information 1536. For instance, the merchant/item information 1536 may include a specified merchant and a specified item for which the buyer would like to obtain financing for purchasing the specified item from the specified merchant. In some examples, the merchant/item information 1536 may include the item price plus tax for the item, while in other examples, the financing program 142 may determine the price and tax for the item from the buyer profile 136 of the specified merchant.

Based on receiving the request for financing from the buyer, transaction eligibility determination logic 1538 included in the financing program 142 may determine whether financing is available for the item(s) specified by the buyer in the request. For example, the transaction might not be eligible for financing if the purchase price is below a minimum threshold amount or over a maximum threshold amount for financing, regardless of the buyer or the merchant. Further, the transaction might not be eligible for financing if the request is for purchasing a type of item for which it is not desirable to offer financing.

In some examples, the transaction eligibility determination logic 1538 may use the transaction eligibility MLM(s) 148 for determining whether the requested transaction is eligible for financing. The transaction eligibility MLM(s) 148 may be trained using the transaction information in the transaction information data structure 132, similar to the training the merchant-eligibility MLM(s) 146 discussed above, and may be any of the types of MLM(s) described with respect to the merchant-eligibility MLM(s) 146.

If the merchant is eligible and the requested transaction is eligible, the buyer eligibility determination logic 1540 included in the financing program 142 may access the transaction information data structure 132 to determine whether there is an existing buyer profile 140 for the buyer. If there is not an existing buyer profile for the buyer, then the buyer eligibility determination logic 1540 may rely at least partially on the provided buyer information 1534. For example, the buyer eligibility determination logic 1540 may obtain a credit score for the buyer from a credit bureau computing device 1542, and may use the credit score and knowledge about the typical customers of the specified merchant, as determined from the transaction information data structure 132, for determining the buyer eligibility (as well as for subsequently determining buyer financing terms if the buyer is eligible).

Furthermore, if a buyer profile 140 for the buyer does exist, the buyer eligibility determination logic 1540 may determine the buyer's past purchase activity at the specified merchant and/or at other merchants classified as being similar to the specified merchant. In some examples, the buyer eligibility determination logic 1540 may obtain the credit score for the buyer from the credit bureau computing device 1542. In addition, the buyer eligibility determination logic 1540 may determine the representative purchase activity of other buyers at the specified merchant (e.g., customers may typically purchase items with pricing similar to that of the item specified by the buyer, rather than lower-priced options) and at merchants classified as being similar to the specified merchant. Based on the buyer's transaction history and the transaction history of the specified merchant and/or similar merchants, the buyer eligibility determination logic 1540 may determine whether the buyer is eligible to receive financing for making a purchase from the specified merchant, and may provide a buyer eligibility determination 1544.

If the buyer eligibility determination 1544 indicates that the buyer is eligible for receiving the financing, the financing program 142 may employ the buyer financing terms logic 1546 for determining the financing terms for the buyer. For instance, the buyer financing terms logic 1534 may determine customized financing terms for the buyer based at least in part on the buyer and merchant transaction information discussed above for determining buyer eligibility. As one example, a transaction profile determined for the specified merchant from the transaction information data structure 132 may be used to determine the financing terms to offer to the buyer seeking to purchase the specified item from the specified merchant. For example, if the specified merchant typically sells to buyers determined to have above-average credit ratings, then the terms offered to the buyer may be more favorable than if this were not the case. Furthermore, if the buyer has a high credit score and/or has conducted a higher volume of purchases through the plurality of merchants than the average buyer, then the terms for the buyer may also be more favorable than if this were not the case. Accordingly, based on the above discussed considerations, the buyer financing terms logic 1546 may generate buyer custom financing terms 1548, which may be provided to the buyer in response to the financing request 1532.

The buyer-eligibility MLM(s) 144 may be trained and used for determining, at least partially, buyer eligibility and/or buyer financing terms using the transaction information discussed above. Examples of machine learning models that may be used for determining buyer eligibility and/or buyer financing terms may include logistic regression models, or other models that are sufficiently transparent that the reason for a denial of credit may be readily determined and/or the reason that certain financing terms are offered may be readily determined to comply with federal and/or state regulations for providing financing to consumers. For example, a model such as a neural network may not be suitable for these purposes unless the reasons for a decision made by the model can be determined, which is often not the case. On the other hand, the merchant-eligibility MLM(s) 146 for determining the merchants eligible to participate in the financing techniques herein, and the transaction-eligibility MLM(s) 148 for determining the transactions eligible for financing, are not so limited by regulations, and may encompass any of a variety of machine learning models, as discussed above.

The buyer-eligibility MLM(s) 144 may be trained, validated, and tested using techniques and multiple data sets similar to those discussed above for the merchant-eligibility MLM(s) 146, and then may be applied to responding to financing requests 1532 received from buyers as the requests are received by the financing program 142. In addition, the machine learning models herein may be periodically retrained, validated, and tested based on newly received transaction information.

Furthermore, in some examples, the buyer eligibility determination logic 1540 may make a buyer eligibility determination that is within a threshold range between determining that the buyer is eligible for financing and that the buyer is ineligible financing. In this situation, the buyer eligibility determination logic 1540 may submit the financing request 1532 to an administrative computing device 1550 for review by a person 1552. For example, the person 1552 may use a manual review application 1554 executing on the administrative computing device 1550 for reviewing the buyer's credit score and other information obtained from the transaction information data structure 132, as well as the information included in the financing request 1532, for determining whether to provide the financing to the buyer. For instance, in some examples, the person may decide to offer only partial financing to the buyer, thus requiring the buyer to essentially make a down payment on the item by providing the rest of the purchase price for the item to the merchant up front.

Additionally, in some examples, the offered financing may include an offer for an additional financed amount when the financing program 142 determines that the buyer may desire or need to purchase other items in addition to the specified item. For example, the financing program 142 may determine from the information in the transaction information data structure 132 whether there are any complimentary or accessory items that are typically purchased with the specified item. If so, the buyer eligibility determination logic 1540 may determine whether the buyer is eligible for financing for the additional purchase price of the additional items. If so, the financing program 142 may provide an offer for the financing that may exceed the amount requested by the buyer. Furthermore, the financing program 142 may include a recommendation that the buyer consider purchasing the one or more accessory items with the additional financing.

Additionally, in some cases, the buyer eligibility determination logic 1540 may determine that the buyer is eligible for only partial financing of the item. In this case, the buyer will have to pay for a remaining portion of the purchase price with a different payment instrument, such as cash, check, credit card, or the like. This technique may also be used to reduce the likelihood of fraud.

Figure 16:
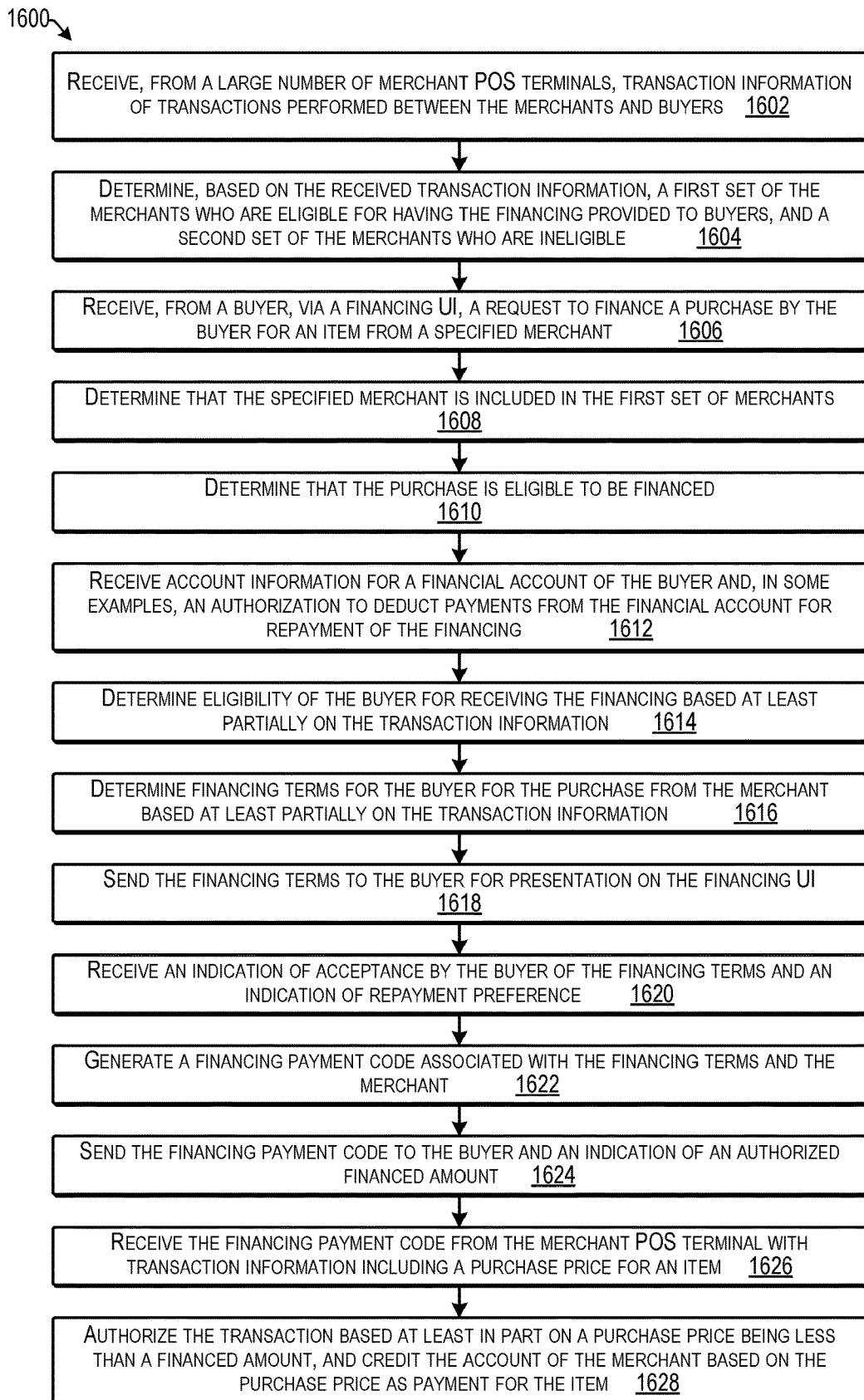
FIG. 16 is a flow diagram illustrating an example process for determining custom financing for a buyer according to some implementations.
Figure 17:
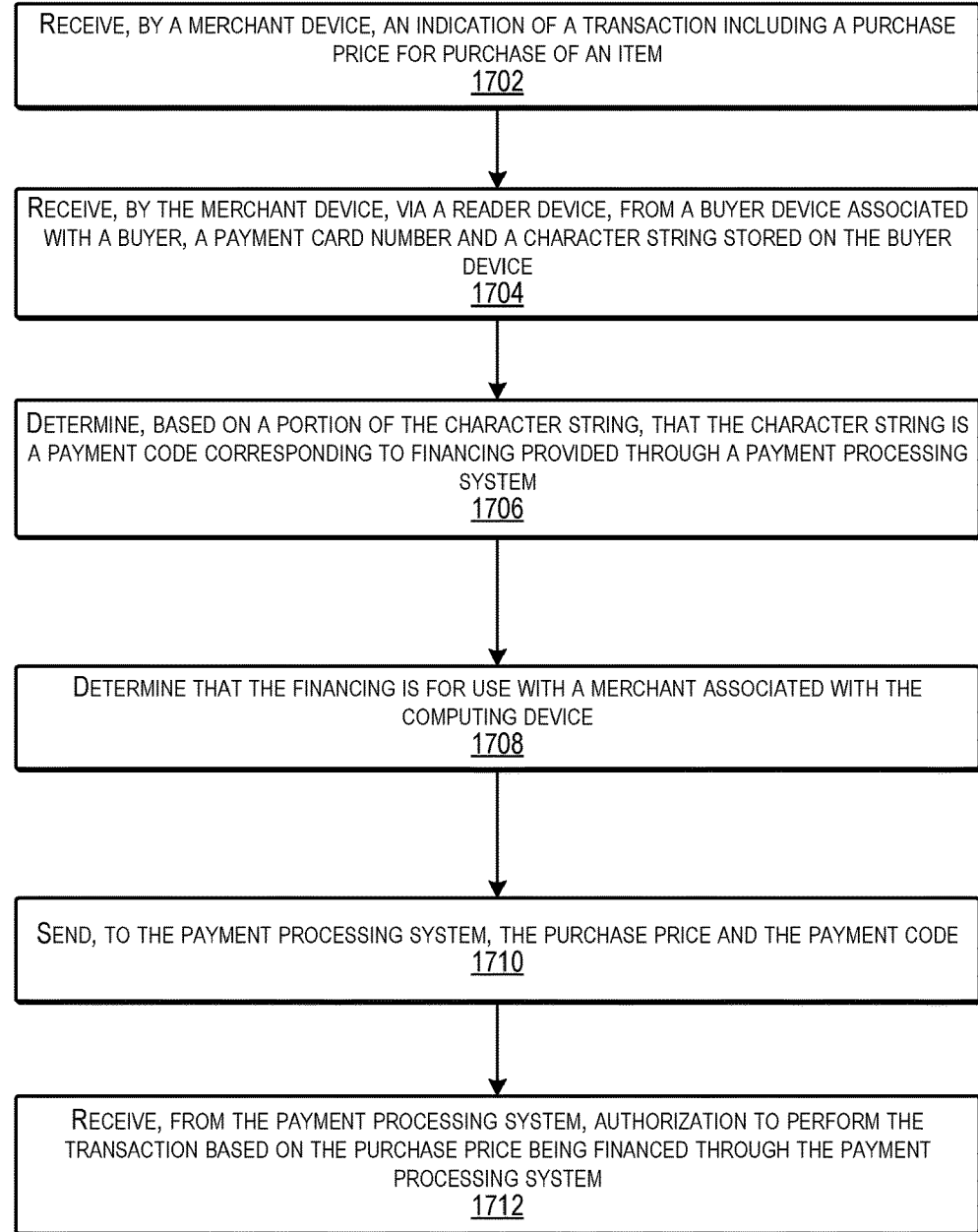
FIG. 17 is a flow diagram illustrating an example process for conducting a transaction using financing according to some implementations.
Figure 18:
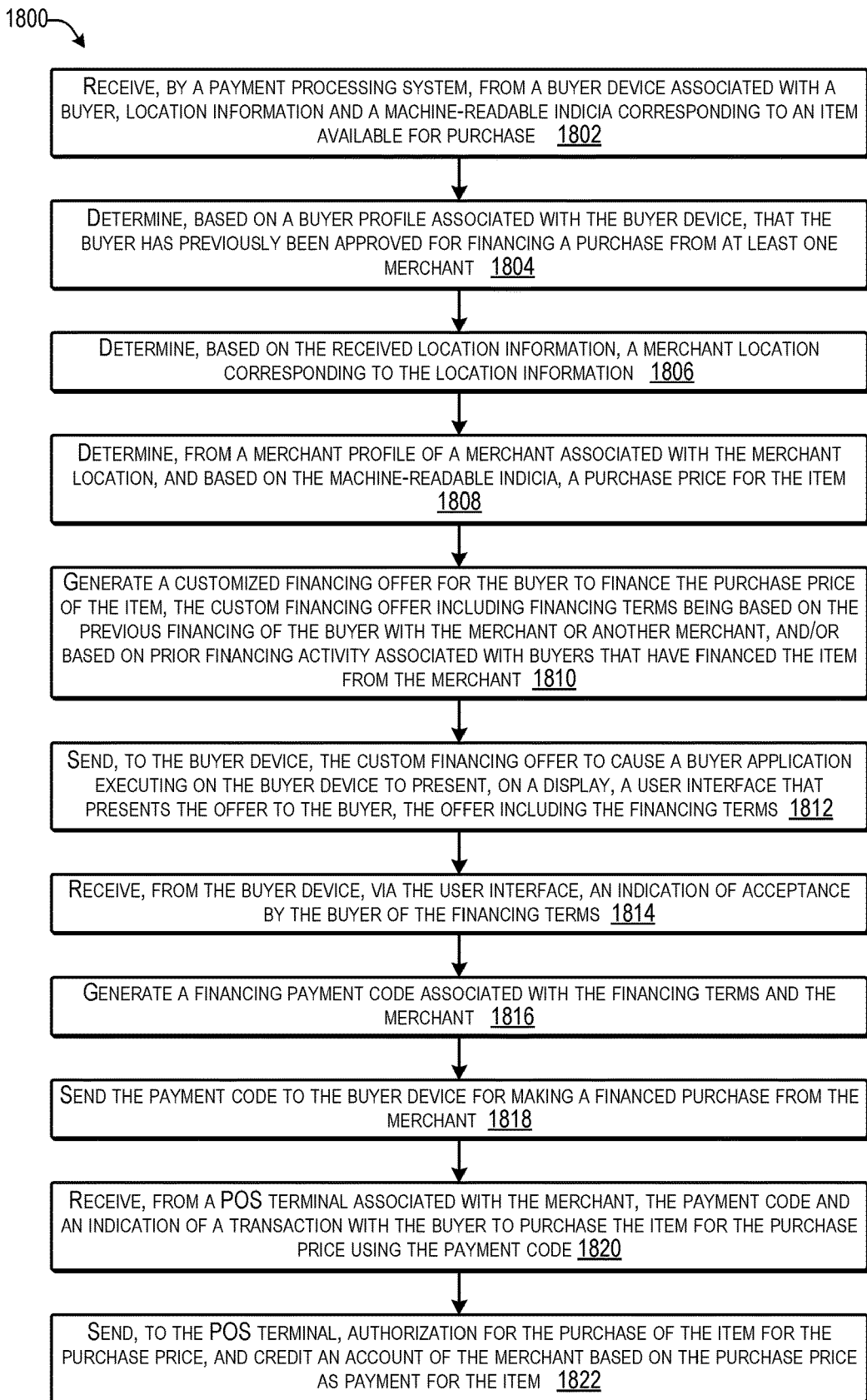
FIG. 18 is a flow diagram illustrating an example process for providing financing to a buyer according to some implementations.

FIGS. 16-18 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

FIG. 16 is a flow diagram illustrating an example process 1600 for providing customized financing according to some implementations. In some examples, the process may be executed at least partially by the service computing device 102 executing the financing program 142, or the like.

At 1602, the computing device may receive, from a large number of merchant POS terminals, transaction information of transactions performed between the merchants and buyers.

At 1604, the computing device may determine, based on the received transaction information, a first set of the merchants who are eligible for having the financing provided to buyers, and a second set of the merchants who are ineligible.

At 1606, the computing device may receive, from a buyer, via a financing UI, a request to finance a purchase by the buyer for an item from a specified merchant.

At 1608, the computing device may determine that the specified merchant is included in the first set of merchants.

At 1610, the computing device may determine that the purchase is eligible to be financed.

At 1612, the computing device may receive account information for a financial account of the buyer and, in some examples, an authorization to deduct payments from the financial account for repayment of the financing. For instance, the computing device may receive, via the user interface, at least prior to sending the payment code, debit card information for a debit card associated with a financial account of the first buyer.

At 1614, the computing device may determine eligibility of the buyer for receiving the financing based at least partially on the transaction information. For example, determining the eligibility may be based at least in part on at least one of: past transactions of the first buyer with the first merchant; past transactions of other buyers with the first merchant; past transactions of the first buyer with merchants classified as being similar to the first merchant; or past transactions of other buyers with merchants classified as being similar to the first merchant.

At 1616, the computing device may determine financing terms for the buyer for the purchase from the first merchant based at least partially on the transaction information. For example, the financing terms may be determined based at least in part on at least one of: past transactions of the first buyer with the first merchant; past transactions of other buyers with the first merchant; past transactions of the first buyer with merchants classified as being similar to the first merchant; or past transactions of other buyers with merchants classified as being similar to the first merchant.

At 1618, the computing device may send the financing terms to the buyer for presentation on the financing UI.

At 1620, the computing device may receive an indication of acceptance by the buyer of the financing terms and an indication of repayment preference.

At 1622, the computing device may generate a financing payment code for the buyer to use at the POS terminal of the merchant. In one example, the payment code is unique or otherwise tied to the merchant and, in some cases, to the item to be purchased by the buyer. For example, the payment code may be a character string. Further, a portion of the character string may indicate to the merchant application that the payment code is associated with financing provided via the payment processing system.

At 1624, the computing device may send the payment code to the buyer and an indication of an authorized financed amount.

At 1626, the computing device may receive the financing payment code from the merchant POS terminal with transaction information including a purchase price for a selected item.

At 1628, the computing device may authorize the transaction based at least in part on a purchase price being less than a financed amount, and may credit an account of the first merchant based on the purchase price as payment for the selected item.

FIG. 17 is a flow diagram illustrating an example process 1700 for conducting a transaction using financing according to some implementations. In some examples, the process may be executed at least partially by the merchant computing device 110 executing the merchant application 118, or the like.

At 1702, the computing device may receive, by a merchant device, an indication of a transaction including a purchase price for purchase of an item. For instance, the indication may include a merchant scanning an item, a buyer tapping on a reader device to pay for an item, or any of the other techniques described herein or other techniques that would be apparent to those of skill in the art having the benefit of the disclosure herein.

At 1704, the computing device may receive, by the merchant device, via a reader device, from a buyer device associated with a buyer, a payment card number and a character string stored on the buyer device.

At 1706, the computing device may determine, based on a portion of the character string, that the character string is a payment code corresponding to financing provided through a payment processing system.

At 1708, the computing device may determine that the financing is for use with a merchant associated with the computing device. For example, determining that the financing is for use with the merchant may include sending the payment code to the payment processing system to determine whether the payment code is for financing a purchase from the merchant, and receiving, from the payment processing system, an indication that the payment code is for financing the purchase from the merchant. Alternatively, determining that the financing is for use with the merchant may include comparing the payment code with a payment code included in financing information previously received from the payment processing system, the financing information indicating that the payment code is for financing a purchase from the merchant.

At 1710, the computing device may send, to the payment processing system, the purchase price and the payment code.

At 1712, the computing device may receive, from the payment processing system, authorization to perform the transaction based on the purchase price being financed through the payment processing system. In some cases, the computing device may present the payment code in a user interface presented to the buyer on a display, the user interface including a first virtual control to enable the buyer to select the payment code for financing the transaction.

FIG. 18 is a flow diagram illustrating an example process 1800 for providing financing to a buyer according to some implementations. In some examples, the process may be executed at least partially by the service computing device 102 executing the financing program 142, or the like.

At 1802, the computing device may receive, by a payment processing system, from a buyer device associated with a buyer, location information and a machine-readable indicia corresponding to an item available for purchase. For example, the machine-readable indicia may include at least one of: a one-dimensional barcode; a two-dimensional barcode; or an image of a label associated with the item.

At 1804, the computing device may determine, based on a buyer profile associated with the buyer device, that the buyer has previously been approved for financing a purchase from at least one merchant.

At 1806, the computing device may determine, based on the received location information, a merchant location corresponding to the location information.

At 1808, the computing device may determine, from a merchant profile of a merchant associated with the merchant location, and based on the machine-readable indicia, a purchase price for the item.

At 1810, the computing device may generate a customized financing offer for the buyer to finance the purchase price of the item, the custom financing offer including financing terms being based on the previous financing of the buyer with the merchant or another merchant, or based on prior financing activity associated with buyers that have financed the item from the first merchant. For example, the financing terms may be determined based at least in part on transaction information received from a plurality of merchant computing devices. Thus, the financing terms for the buyer may be based on least one of: past transactions of the buyer with the merchant; past transactions of other buyers with the merchant; past transactions of the buyer with merchants classified as being similar to the merchant; or past transactions of other buyers with merchants classified as being similar to the merchant. In some examples, when a buyer uses a credit card or other payment instrument at the POS terminal, the payment processing system may identify the buyer and any past financing requested by the buyer through payment processing system. In response, the financing program may immediately underwrite/generate a custom financing offer for the buyer in real-time, i.e., while the transaction is being conducted, based on the past financing activity with the merchant or with other merchants that use the payment processing system.

At 1812, the computing device may send, to the buyer device, custom financing offer to cause a buyer application executing on the buyer device to present, on a display, a user interface that presents the offer to the buyer, the offer including financing terms.

At 1814, the computing device may receive, from the buyer device, via the user interface, an indication of acceptance by the buyer of the financing terms. Furthermore, the computing device may receive, via the user interface, at least prior to sending the payment code, an authorization to charge a debit card associated with a financial account of the buyer to deduct payment from the financial account for repayment of the financing.

At 1816, the computing device may generate a financing payment code for the buyer to use at the POS terminal of the merchant. In one example, the payment code is unique or otherwise tied to the merchant and, in some cases, to the item to be purchased by the buyer. For example, the payment code may include a character string. Further, a portion of the character string may indicate to the merchant application that the payment code is associated with financing provided via the payment processing system.

At 1818, the computing device may send the payment code to the buyer device for making a financed purchase from the merchant. Additionally, based on sending the payment code to the buyer device, the computing device may send, to the POS terminal associated with the merchant, the payment code and an indication of approval of financing for the buyer for purchase of one or more items from the merchant using the payment code At 1820, the computing device may receive, from a POS terminal associated with the merchant, the payment code and an indication of a transaction with the buyer to purchase the item for the purchase price using the payment code.

At 1822, the computing device may send, to the POS terminal, authorization for the purchase of the item for the purchase price, and credit an account of the merchant based on the purchase price as payment for the item.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 19:
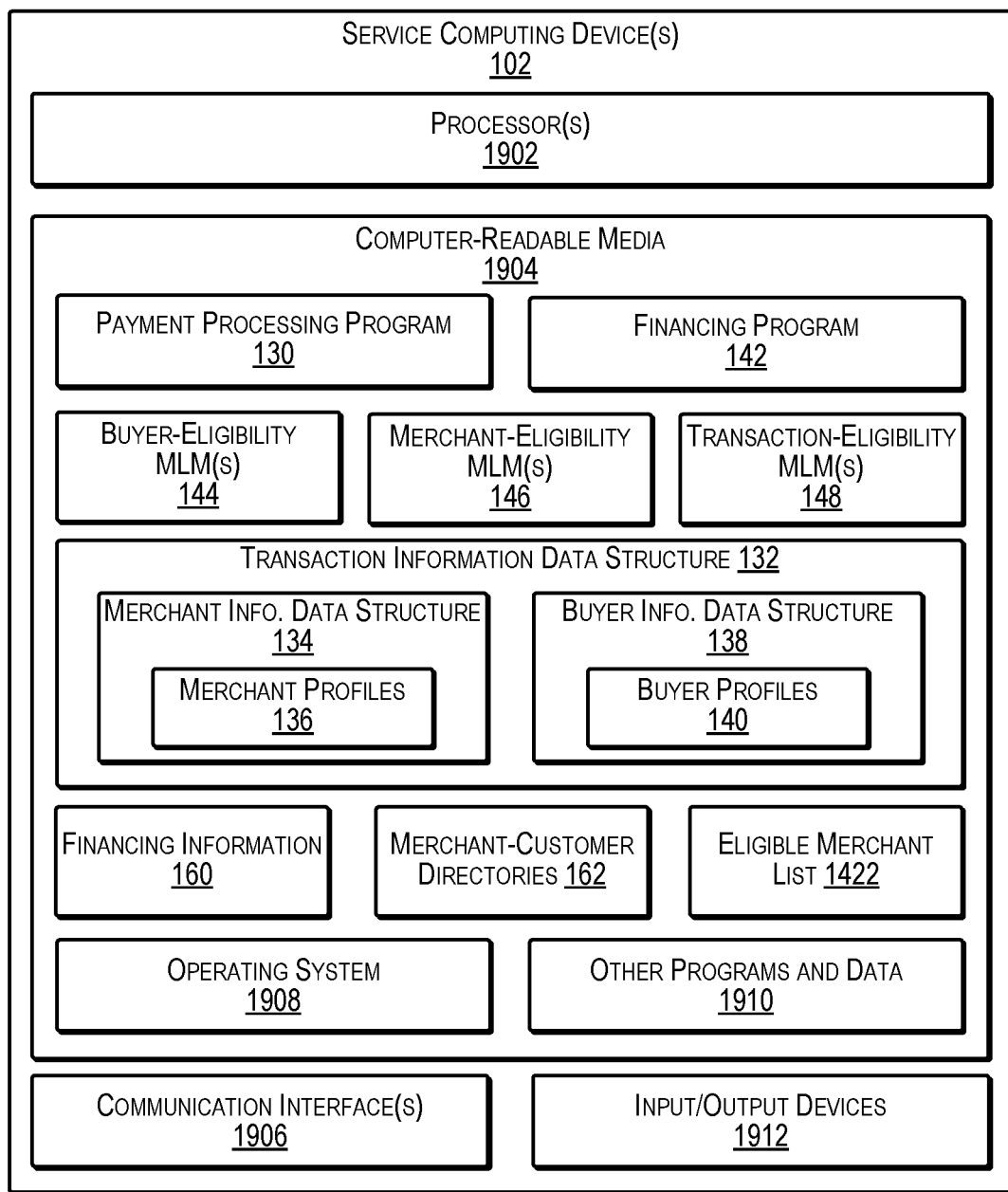
FIG. 19 illustrates select components of one or more example service computing devices according to some implementations.

FIG. 19 illustrates select components of the service computing device 102 that may be used to implement some functionality of the services described herein. The service computing device 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 1902, one or more computer-readable media 1904, and one or more communication interfaces 1906. Each processor 1902 may be a single processing unit or a number of processing units, and may include single or multiple computing units or multiple processing cores. The processor(s) 1902 can be implemented as one or more microprocessors, microcomputers, microcontrollers, digital signal processors, central processing units, state machines, logic circuitries, and/or any devices that manipulate signals based on operational instructions. For instance, the processor(s) 1902 may be one or more hardware processors and/or logic circuits of any suitable type specifically programmed or configured to execute the algorithms and processes described herein. The processor(s) 1902 can be configured to fetch and execute computer-readable instructions stored in the computer-readable media 1904, which can program the processor(s) 1902 to perform the functions described herein.

The computer-readable media 1904 may include volatile and nonvolatile memory and/or removable and non-removable media implemented in any type of technology for storage of information, such as computer-readable instructions, data structures, program modules, or other data. Such computer-readable media 1904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1904 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 1904 may be used to store any number of functional components that are executable by the processors 1902. In many implementations, these functional components comprise instructions or programs that are executable by the processors 1902 and that, when executed, specifically configure the one or more processors 1902 to perform the actions attributed above to the service computing device 102. Functional components stored in the computer-readable media 1904 may include the payment processing program 130 and the financing program 142. Additional functional components stored in the computer-readable media 1904 may include an operating system 1908 for controlling and managing various functions of the service computing device 102.

In addition, the computer-readable media 1904 may store data used for performing the operations described herein. Thus, the computer-readable media 1904 may store the transaction information data structure 132, the merchant information data structure 134, including merchant profiles 136, and the buyer information data structure 138, including buyer profiles 140. In some examples, the transaction information data structure 132 may encompass the merchant information data structure 134 and the buyer information data structure 138. Additional data may include the financing information 160, the merchant-customer directories 162, and the eligible merchant list 1422.

In addition, the computer-readable media 1904 may store or otherwise maintain the machine-learning models and associated training, validation, and testing data, and other model building data. For example, the computer-readable media may maintain the buyer-eligibility machine learning model(s) 144; the merchant-eligibility machine learning model(s) 146, and the transaction-eligibility machine learning model(s) 148, as discussed above.

The service computing device 102 may also include or maintain other functional components and data not specifically shown in FIG. 19, such as other programs and data 1910, which may include programs, drivers, etc., and the data used or generated by the functional components. Further, the service computing device 102 may include many other logical, programmatic, and physical components, of which those described above are merely examples that are related to the discussion herein.

The communication interface(s) 1906 may include one or more interfaces and hardware components for enabling communication with various other devices, such as over the network(s) 106. For example, communication interface(s) 1906 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 1912. Such I/O devices 1912 may include a display, various user interface controls (e.g., buttons, joystick, keyboard, mouse, touch screen, etc.), audio speakers, connection ports and so forth.

Figure 20:
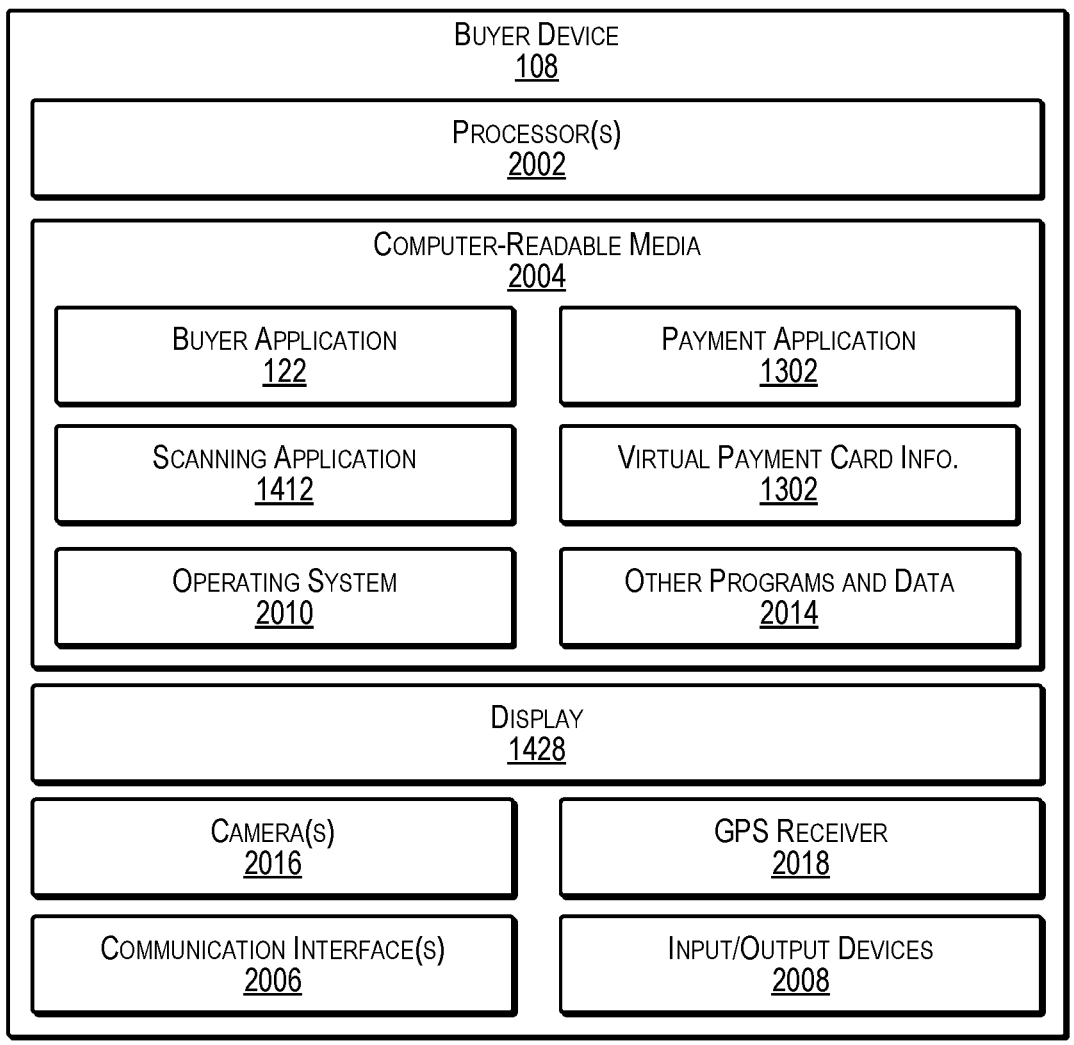
FIG. 20 illustrates select components of an example buyer device according to some implementations.

FIG. 20 illustrates select example components of the buyer device 108 that may implement the functionality described above according to some examples. The buyer device 108 may include any of a number of different types of portable or otherwise mobile computing devices. Some examples of the buyer device 108 may include smart phones and mobile communication devices; tablet computing devices; laptops, netbooks and other mobile computers; wearable computing devices and/or body-mounted computing devices, which may include watches; augmented and virtual reality devices, such as helmets, goggles or glasses; and any other mobile device capable of sending communications and performing the functions according to the techniques described herein.

In the example of FIG. 20, the buyer device 108 includes components such as at least one processor 2002, one or more computer-readable media 2004, one or more communication interfaces 2006, and one or more input/output (I/O) devices 2008. Each processor 2002 may itself comprise one or more processors or processing cores. For example, the processor 2002 can be implemented as one or more microprocessors, microcomputers, microcontrollers, digital signal processors, central processing units, state machines, logic circuitries, and/or any devices that manipulate signals based on operational instructions. In some cases, the processor 2002 may be one or more hardware processors and/or logic circuits of any suitable type specifically programmed or configured to execute the algorithms and processes described herein. The processor 2002 can be configured to fetch and execute computer-readable processor-executable instructions stored in the computer-readable media 2004.

Depending on the configuration of the buyer device 108, the computer-readable media 2004 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 2004 may include, but is not limited to, RAM, ROM, EEPROM, flash memory, solid-state storage, magnetic disk storage, optical storage, and/or other computer-readable media technology. Further, in some cases, the buyer device 108 may access external storage, such as RAID storage systems, storage arrays, network attached storage, storage area networks, cloud storage, or any other medium that can be used to store information and that can be accessed by the processor 2002 directly or through another computing device or network. Accordingly, the computer-readable media 2004 may be computer storage media able to store instructions, programs, or components that may be executed by the processor 2002. Further, when mentioned herein, non-transitory computer-readable media exclude media such as energy, carrier signals, electromagnetic waves, and signals per se.

The computer-readable media 2004 may be used to store and maintain any number of functional components that are executable by the processor 2002. In some implementations, these functional components comprise instructions or programs that are executable by the processor 2002 and that, when executed, implement operational logic for performing the actions and services attributed above to the buyer device 108. Functional components of the buyer device 108 stored in the computer-readable media 2004 may include the buyer application 122, the payment application 1302, and the scanning application 1412. Additional functional components may include an operating system 2010 for controlling and managing various functions of the buyer device 108 and for enabling basic user interactions with the buyer device 108.

In addition, the computer-readable media 2004 may also store data, data structures and the like, that are used by the functional components. Examples of data stored on the computer-readable media include virtual payment card information 2012, which may include the financing payment code and other information related to the approved financing. Depending on the type of the buyer device 108, the computer-readable media 2004 may also optionally include other functional components and data, such as other programs and data 2014, which may include applications, programs, drivers, etc., and the data used or generated by the functional components. Further, the buyer device 108 may include many other logical, programmatic, and physical components, of which those described are merely examples that are related to the discussion herein.

The communication interface(s) 2006 may include one or more interfaces and hardware components for enabling communication with various other devices, such as over the network(s) 106 or directly. For example, communication interface(s) 2006 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 20 further illustrates that the buyer device 108 may include the display 1428, which may be any suitable type of electronic display device for visually presenting information, UIs, or the like. Alternatively, in some examples, the buyer device 108 may not include a display.

The buyer device 108 may further include the one or more I/O devices 2008. The I/O devices 2008 may include speakers, a microphone, and various user controls (e.g., buttons, a joystick, a keyboard, a keypad, etc.), a haptic output device, and so forth. Other components included in the buyer device 108 may include various types of sensors, which may include one or more cameras 2016, a GPS receiver 2018 able to receive and indicate location information, as well as other sensors (not shown) such as an accelerometer, gyroscope, compass, proximity sensor, and the like. In some cases, the GPS receiver 2018 may be used by the buyer application 122 or other applications to determine a current geographic location of the buyer device 108. Additionally, or alternatively, the communication interfaces 2006 may be used to determine the current location of the buyer device 108, such as based on communication with nearby cell towers, wireless access points, and the like.

Figure 21:
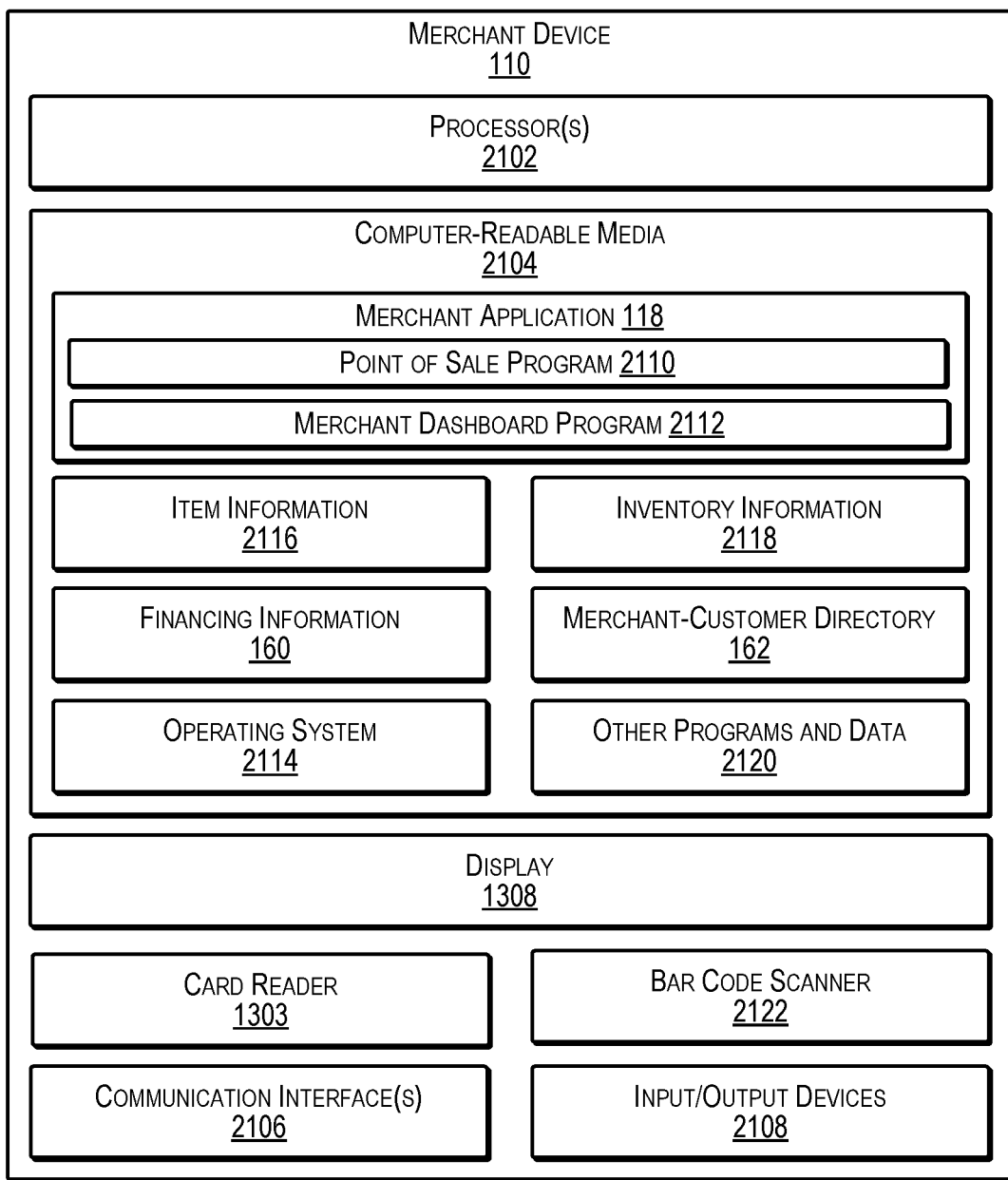
FIG. 21 illustrates select components of an example merchant device according to some implementations.

FIG. 21 illustrates select example components of an example merchant device 110 according to some implementations. The merchant device 110 may be any suitable type of computing device, e.g., portable, semi-portable, semi-stationary, or stationary. Some examples of the merchant device 110 may include tablet computing devices; smart phones and mobile communication devices; laptops, netbooks and other portable computers or semi-portable computers; desktop computing devices, terminal computing devices, and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 110 includes at least one processor 2102, one or more computer-readable media 2104, one or more communication interfaces 2106, and one or more input/output (I/O) devices 2108. Each processor 2102 may itself comprise one or more processors or processing cores. For example, the processor 2102 can be implemented as one or more microprocessors, microcomputers, microcontrollers, digital signal processors, central processing units, state machines, logic circuitries, and/or any devices that manipulate signals based on operational instructions. In some cases, the processor 2102 may be one or more hardware processors and/or logic circuits of any suitable type specifically programmed or configured to execute the algorithms and processes described herein. The processor 2102 can be configured to fetch and execute computer-readable processor-executable instructions stored in the computer-readable media 2104.

Depending on the configuration of the merchant device 110, the computer-readable media 2104 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 2104 may include, but is not limited to, RAM, ROM, EEPROM, flash memory, solid-state storage, magnetic disk storage, optical storage, and/or other computer-readable media technology. Further, in some cases, the merchant device 110 may access external storage, such as RAID storage systems, storage arrays, network attached storage, storage area networks, cloud storage, or any other medium that can be used to store information and that can be accessed by the processor 2102 directly or through another computing device or network. Accordingly, the computer-readable media 2104 may be computer storage media able to store instructions, programs, or components that may be executed by the processor 2102. Further, when mentioned, non-transitory computer-readable media exclude media such as energy, carrier signals, electromagnetic waves, and signals per se.

The computer-readable media 2104 may be used to store and maintain any number of functional components that are executable by the processor 2102. In some implementations, these functional components comprise instructions or programs that are executable by the processor 2102 and that, when executed, implement operational logic for performing the actions and services attributed above to the merchant device 110. Functional components of the merchant device 110 stored in the computer-readable media 2104 may include the merchant application 118. In some examples, the merchant application 118 may include a point of sale program 2110 which may provide register functionality with transaction processing capability, such as for presenting a user interface to enable the merchant to conduct transactions, receive payments, and so forth, as well as communicating with the service computing device 102 for processing payments, sending transaction information, receiving order information, sending merchant information, and so forth. Further, in some examples, the merchant application 118 may include a merchant dashboard program 2112 with functionality for presenting a UI to enable the merchant to manage the merchant's account, the merchant profile, merchant preferences, view past orders, update inventory information, update item information, and the like. Additional functional components may include an operating system 2114 for controlling and managing various functions of the merchant device 110 and for enabling basic user interactions with the merchant device 110.

In addition, the computer-readable media 2104 may also store data, data structures and the like, that are used by the functional components. For example, data stored by the computer-readable media 2104 may include item information 2116 that includes information about the items offered by the merchant, which may include images of the items, descriptions of the items, prices of the items, UPC information for the items, and so forth. In addition, inventory information 2118 may indicate how much of each item the merchant has in current inventory. The data stored in the computer-readable media 2104 may further include financing information 160 and/or a merchant-customer directory 162, which may be received from the service computing device 102 and which may include financing information for specific buyers approved by the financing program to purchase items via finance from the merchant.

Depending on the type of the merchant device 110, the computer-readable media 2104 may also optionally include other functional components and data, such as other modules and data 2120, which may include programs, drivers, etc., and the data used or generated by the functional components. Further, the merchant device 110 may include many other logical, programmatic, and physical components, of which those described are merely examples that are related to the discussion herein.

The communication interface(s) 2106 may include one or more interfaces and hardware components for enabling communication with various other devices, such as over the network(s) 106 or directly. For example, communication interface(s) 2106 may enable communication through one or more of the Internet, cable networks, cellular networks, wireless networks (e.g., Wi-Fi) and wired networks, as well as short-range communications such as Bluetooth®, Bluetooth® low energy, and the like, as additionally enumerated elsewhere herein.

FIG. 21 further illustrates that the merchant device 110 may include the display 1308. Depending on the type of computing device used as the merchant device 110, the display 1308 may employ any suitable display technology, and may have a touch sensor in some examples. Alternatively, in some examples, the merchant device 110 may not include the display 1308, and information may be presented by other means, such as aurally.

The merchant device 110 may further include the one or more I/O devices 2108. The I/O devices 2108 may include speakers, a microphone, a camera, and various user controls (e.g., buttons, a joystick, a keyboard, a keypad, etc.), a haptic output device, and so forth.

In addition, the merchant device 110 may include or may be connectable to a card reader 1303. In some examples, the card reader 1303 may plug in to a port in the merchant device, such as a microphone/headphone port, a data port, or other suitable port. The card reader 1303 may include a read head for reading a magnetic strip of a payment card, and further may include encryption technology for encrypting the information read from the magnetic strip. Additionally, or alternatively, numerous other types of card readers may be employed with the merchant devices 110 herein, such as RFID chip card readers, and card readers able to communicate wirelessly with buyer devices for receiving contactless payments, depending on the type and configuration of the merchant device 110. In addition, in some cases, the merchant device may include a barcode scanner 2122 that may be used, e.g., to scan barcodes on items being purchased. Additionally, the merchant device 110 may include various other components that are not shown, examples of which include sensors, removable storage, a power source, such as a battery and power control unit, and so forth.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
receiving, at a payment processing system, identity information identifying a buyer and item information including a purchase price for purchase of an item from a first merchant;
determining, via the payment processing system, based on the identity information and the item information, that the buyer is eligible for financing the purchase of the item;
generating, via the payment processing system, a customized financing offer for the buyer to finance the purchase price of the item, wherein the customized financing offer includes financing terms and is based on at least one of:
previous financing activity of the buyer with one or more merchants associated with the payment processing system, or previous financing activity associated with one or more buyers that have financed the item from the first merchant;

transmitting, via the payment processing system, the customized financing offer so as to cause a user interface to present the customized financing offer to the buyer, by updating the user interface to present the customized financing offer with at least one selectable virtual control;

receiving, via the user interface, an indication of acceptance by the buyer of the financing terms;

in response to receiving the indication of acceptance by the buyer of the financing terms, sending a payment code to a buyer device of the buyer to use for making the purchase from the first merchant;

sending, to a merchant device of the first merchant, in advance of a transaction for the purchase between the buyer and the first merchant, financing information including the payment code, wherein the merchant device is configured to store the financing information;

receiving, from the merchant device of the first merchant, an indication that the first merchant has received and verified the payment code from the buyer for performing the transaction at the merchant device based on the financing offer and the purchase price; and crediting an account of the first merchant based on the purchase price as payment for the item.

2. The method as recited in claim 1, further comprising identifying the buyer based on receiving payment instrument information from the buyer device and matching the payment instrument information with buyer information maintained in a data structure of previously received transaction information.

3. The method as recited in claim 1, further comprising:
receiving, by the payment processing system, from a plurality of merchant devices associated with a plurality of merchants, respectively, transaction information of transactions performed between the plurality of merchants and a plurality of buyers, the merchant devices having respective instances of a merchant application installed thereon for configuring the plurality of merchant devices to communicate the transaction information over a network to the payment processing system;

training a machine learning model using at least a first portion of the transaction information to train the machine learning model; and inputting a portion of the transaction information related to at least the buyer into the trained machine learning model to determine the customized financing offer for the buyer.

4. The method as recited in claim 1, further comprising determining that the transaction for the item is eligible for receiving financing based at least in part on a price for the items at the first merchant determined based on item pricing information previously received from the first merchant.

5. The method as recited in claim 1, wherein the user interface is presented on a display associated with the buyer device associated with the buyer, and is updated in real time to present the customized financing offer.

6. The method as recited in claim 1, further comprising:
receiving, by the payment processing system, from a plurality of merchant devices associated with a plurality of merchants, respectively, transaction information of transactions performed between the plurality of merchants and a plurality of buyers, the merchant devices having respective instances of a merchant application installed thereon for configuring the plurality of merchant devices to communicate the transaction information over a network to the payment processing system; and determining, based at least in part on the transaction information, that the first merchant is eligible to have financing provided to the buyer for conducting a financed transaction with the first merchant.

7. The method as recited in claim 1, wherein the payment code is a character string including a plurality of characters, wherein a first portion of the character string indicates to the merchant device that the buyer has been qualified by the payment processing system to receive financing.

8. The method as recited in claim 1, wherein:
sending the financing information to the merchant device includes sending at least one of:
identifying information about the buyer, or
a security code associated with the payment code, and
the merchant device is configured to store the payment code in association with the at least one of the identifying information or the security code in advance of the buyer initiating the transaction.

9. A non-transitory computer-readable medium storing instructions that, when executed by one or more processors, configure the one or more processors to perform operations comprising:
receiving identity information identifying a user and item information including a purchase price for purchase of an item from a first merchant;

determining based on the identity information and the item information, that the user is eligible for financing the purchase of the item;

generating a customized financing offer for the user to finance the purchase price of the item, wherein the customized financing offer includes financing terms and is based on at least one of:
previous financing activity of the user with one or more merchants associated with a payment processing system, or
previous financing activity associated with one or more users that have financed the item from the first merchant;

transmitting the customized financing offer to cause a user interface to present the customized financing offer to the user, by updating the user interface to present the customized financing offer with at least one selectable virtual control;

receiving, via the user interface, an indication of acceptance by the user of the financing terms;

in response to receiving the indication of acceptance by the user of the financing terms, sending a payment code to a user device of the user to use for making the purchase from the first merchant;

sending, to a merchant device of the first merchant, in advance of a transaction for the purchase between the user and the first merchant, financing information including the payment code, wherein the merchant device is configured to store the financing information;

receiving, from the merchant device of the first merchant, an indication that the first merchant has received and verified the payment code from the user for performing the transaction at the merchant device based on the financing offer and the purchase price; and crediting an account of the first merchant based on the purchase price as payment for the item.

10. The non-transitory computer-readable medium as recited in claim 9, the operations further comprising identifying the user based on receiving payment instrument information from the user device and matching the payment instrument information with user information maintained in a data structure of previously received transaction information.

11. The non-transitory computer-readable medium as recited in claim 9, the operations further comprising:
receiving, by the one or more processors, from a plurality of merchant devices associated with a plurality of merchants, respectively, transaction information of transactions performed between the plurality of merchants and a plurality of users, the merchant devices having respective instances of a merchant application installed thereon for configuring the plurality of merchant devices to communicate the transaction information over a network to the one or more processors;
training a machine learning model using at least a first portion of the transaction information to train the machine learning model; and
inputting a portion of the transaction information related to at least the user into the trained machine learning model to determine the customized financing offer for the user.

12. The non-transitory computer-readable medium as recited in claim 9, wherein the user interface is presented on a display associated with the user device associated with the user, and is updated in real time to present the customized financing offer.

13. The non-transitory computer-readable medium as recited in claim 9, the operations further comprising:
receiving, by the one or more processors, from a plurality of merchant devices associated with a plurality of merchants, respectively, transaction information of transactions performed between the plurality of merchants and a plurality of users, the merchant devices having respective instances of a merchant application installed thereon for configuring the plurality of merchant devices to communicate the transaction information over a network to the one or more processors; and
determining, based at least in part on the transaction information, that the first merchant is eligible to have financing provided to the user for conducting a financed transaction with the first merchant.

14. The non-transitory computer-readable medium as recited in claim 9, wherein the payment code is a character string including a plurality of characters, wherein a first portion of the character string indicates to the merchant device that the user has been qualified by the payment processing system to receive financing.

15. The non-transitory computer-readable medium as recited in claim 9, wherein:
sending the financing information to the merchant device includes sending at least one of:
identifying information about the user, or
a security code associated with the payment code, and
the merchant device is configured to store the payment code in association with the at least one of the identifying information or the security code in advance of the user initiating the transaction.

16. A system comprising:
one or more processors configured by executable instructions to perform operations that include:
receiving identity information identifying a user and item information including a purchase price for purchase of an item from a first merchant;
determining based on the identity information and the item information, that the user is eligible for financing the purchase of the item;
generating a customized financing offer for the user to finance the purchase price of the item, wherein the customized financing offer includes financing terms and is based on at least one of:
previous financing activity of the user with one or more merchants associated with a payment processing system, or
previous financing activity associated with one or more users that have financed the item from the first merchant;
transmitting the customized financing offer to cause a user interface to present the customized financing offer to the user, by updating the user interface to present the customized financing offer with at least one selectable virtual control;
receiving, via the user interface, an indication of acceptance by the user of the financing terms;
in response to receiving the indication of acceptance by the user of the financing terms, sending a payment code to a user device of the user to use for making the purchase from the first merchant;
sending, to a merchant device of the first merchant, in advance of a transaction for the purchase between the user and the first merchant, financing information including the payment code, wherein the merchant device is configured to store the financing information;
receiving, from the merchant device of the first merchant, an indication that the first merchant has received and verified the payment code from the user for performing the transaction at the merchant device based on the financing offer and the purchase price; and
crediting an account of the first merchant based on the purchase price as payment for the item.

17. The system as recited in claim 16, the operations further comprising identifying the user based on receiving payment instrument information from the user device and matching the payment instrument information with user information maintained in a data structure of previously received transaction information.

18. The system as recited in claim 16, the operations further comprising:
receiving, by the one or more processors, from a plurality of merchant devices associated with a plurality of merchants, respectively, transaction information of transactions performed between the plurality of merchants and a plurality of users, the merchant devices having respective instances of a merchant application installed thereon for configuring the plurality of merchant devices to communicate the transaction information over a network to the one or more processors;
training a machine learning model using at least a first portion of the transaction information to train the machine learning model; and
inputting a portion of the transaction information related to at least the user into the trained machine learning model to determine the customized financing offer for the user.

19. The system as recited in claim 16, wherein the user interface is presented on a display associated with the user device associated with the user, and is updated in real time to present the customized financing offer.

20. The system as recited in claim 16, the operations further comprising:
- receiving, by the one or more processors, from a plurality of merchant devices associated with a plurality of merchants, respectively, transaction information of transactions performed between the plurality of merchants and a plurality of users, the merchant devices having respective instances of a merchant application installed thereon for configuring the plurality of merchant devices to communicate the transaction information over a network to the one or more processors; and
- determining, based at least in part on the transaction information, that the first merchant is eligible to have financing provided to the user for conducting a financed transaction with the first merchant.

21. The system as recited in claim 16, wherein the payment code is a character string including a plurality of characters, wherein a first portion of the character string indicates to the merchant device that the user has been qualified by the payment processing system to receive financing.

22. The system as recited in claim 16, wherein:
sending the financing information to the merchant device includes sending at least one of:
- identifying information about the user, or
- a security code associated with the payment code, and the merchant device is configured to store the payment code in association with the at least one of the identifying information or the security code in advance of the user initiating the transaction.

* * * * *